US012633642B2

(12) United States Patent
Kolokotronis

(10) Patent No.: US 12,633,642 B2
(45) Date of Patent: May 19, 2026

(54) ANTENNA SUPPORT SYSTEM

(71) Applicant: Dimitris Kolokotronis, Athens (GR)

(72) Inventor: Dimitris Kolokotronis, Athens (GR)

( * ) Notice: Subject to any disclaimer, the term of this patent is extended or adjusted under 35 U.S.C. 154(b) by 139 days.

(21) Appl. No.: 18/568,790

(22) PCT Filed: Jun. 8, 2022

(86) PCT No.: PCT/EP2022/065495
§ 371 (c)(1),
(2) Date: Dec. 8, 2023

(87) PCT Pub. No.: WO2022/258663
PCT Pub. Date: Dec. 15, 2022

(65) Prior Publication Data
US 2024/0275018 A1 Aug. 15, 2024

(30) Foreign Application Priority Data
Jun. 8, 2021 (GB) ..................................... 2108169

(51) Int. Cl.
*H01Q 1/12* (2006.01)
*H01Q 1/24* (2006.01)
*H01Q 3/06* (2006.01)

(52) U.S. Cl.
CPC ........... *H01Q 1/1228* (2013.01); *H01Q 1/246* (2013.01); *H01Q 3/06* (2013.01)

(58) Field of Classification Search
CPC ......... H01Q 1/1228; H01Q 1/246; H01Q 3/06
See application file for complete search history.

(56) References Cited

U.S. PATENT DOCUMENTS 4,745,412 A 5/1988 Creaser, Jr.
5,787,673 A * 8/1998 Noble .................. E04H 12/085
52/114

(Continued)

FOREIGN PATENT DOCUMENTS

WO 2019110697 A1 6/2019
WO 2021074335 A1 4/2021

OTHER PUBLICATIONS

UK Intellectual Property Office, Search Report under Section 17(5), GB Application No. GB2108169.0, dated Mar. 3, 2022, GB.

(Continued)

*Primary Examiner* — Monica E Millner
(74) *Attorney, Agent, or Firm* — Reichel Stohry Dean LLP; Natalie J. Dean

(57) ABSTRACT

An antenna support system (100) having a first antenna mounting assembly (102) comprising a first side subassembly comprising a first clamping plate (148), a second clamping plate, a first mounting member (110) disposed between and attached to the first and second clamping plates such that the mounting member is perpendicular to the first and second clamping plates. An azimuth steering unit (106) is supported by the mounting member. A second side subassembly is provided comprising a first clamping member (146), first and second mechanical fasteners (120, 122) configured to join the first side subassembly and the second side subassembly either side of a support member (22) to thereby clamp the first antenna mounting assembly to the support member in use.

19 Claims, 17 Drawing Sheets

(56) References Cited

U.S. PATENT DOCUMENTS

| | | | | |
|---|---|---|---|---|
| 5,971,345 | A * | 10/1999 | Khalaf | H01Q 1/1228 343/890 |
| 6,739,561 | B2 * | 5/2004 | Herzog | H01Q 1/125 248/218.4 |
| 7,086,207 | B2 * | 8/2006 | Piburn | H01Q 1/1235 52/645 |
| 7,106,273 | B1 * | 9/2006 | Brunson | H01Q 1/246 343/890 |
| 7,659,865 | B2 * | 2/2010 | Kreitzberg | H01Q 1/1235 343/890 |
| 9,857,023 | B2 * | 1/2018 | Alban | H01Q 1/1242 |
| 9,893,410 | B2 * | 2/2018 | Kolokotronis | H01Q 3/04 |
| 10,686,243 | B2 * | 6/2020 | Kolokotronis | H01Q 3/04 |
| 11,387,538 | B2 * | 7/2022 | Liu | H01Q 1/1228 |
| 11,483,632 | B2 * | 10/2022 | Ojha | H01Q 1/18 |
| 11,831,065 | B2 * | 11/2023 | Kolokotronis | H01Q 1/1221 |
| 12,027,748 | B2 * | 7/2024 | Han | H01Q 3/08 |
| 2012/0132781 | A1 * | 5/2012 | Kolokotronis | H01Q 1/1235 248/535 |
| 2018/0115047 | A1 * | 4/2018 | Tsukada | H01Q 1/12 |
| 2021/0194109 | A1 * | 6/2021 | Shao | H01Q 1/1242 |
| 2021/0226314 | A1 * | 7/2021 | Kolokotronis | H01Q 1/1228 |
| 2021/0359390 | A1 * | 11/2021 | Han | H01Q 1/12 |
| 2021/0408661 | A1 * | 12/2021 | Yoo | H01Q 1/246 |
| 2023/0318162 | A1 * | 10/2023 | Severin | H01Q 1/246 343/702 |
| 2024/0136698 | A1 * | 4/2024 | Kolokotronis | H01Q 1/1264 |
| 2024/0266712 | A1 * | 8/2024 | Kolokotronis | H01Q 1/1242 |

OTHER PUBLICATIONS

International Searching Authority, International Search Report, International Application No. PCT/EP2022/065495, dated Sep. 13, 2022, NL.

* cited by examiner

ANTENNA SUPPORT SYSTEM

PRIORITY

The present application is related to, and claims the priority benefit of, and is a 35 U.S.C. 371 national stage application of, International Patent Application No. PCT/EP2022/065495, filed Jun. 8, 2022, which is related to, and claims the priority benefit of Great Britian Patent Application No. 2108169.0, filed Jun. 8, 2021. The contents of the aforementioned applications are hereby incorporated by reference in their entireties into this disclosure.

TECHNICAL FIELD

The present invention relates to an improved antenna support system and method of installing the same. More specifically, the present invention is concerned with a system and method well suited to mounting modern cellular antennas on towers and masts.

By 'modern' cellular antennas we mean 5G technology and beyond, MIMO and massive-MIMO, multi-band, multi-beam, multi-directional, active or passive antennas.

BACKGROUND ART

Since the early days of mobile communication technology back in the 1990's, directional cellular antennas on towers and masts, have been installed using the same principle. The antennas had to be placed high from the ground in order to reduce the RF path-loss effects (or RF signal attenuation). The antennas also need to point in specific directions in the horizontal plane (i.e. at an azimuth angle about a vertical axis—alignment of the antenna directionality with respect to North) and in the vertical plane (i.e. tilt angle about an horizontal axis—alignment of the antenna directionality with respect to the earth's centre of gravity) in order to satisfy certain RF planning criteria for optimum coverage, capacity and quality of wireless communications.

In order to install antennas at a specified height from the ground, mobile communication networks worldwide adopted the engineering and design of very well-known tower and mast types such as lattice and pole systems. The terms "mast" and "tower" are often used interchangeably, and it is to be understood that the term "mast" is used in this application to cover both masts and towers. However, it will be noted that in structural engineering terms, a tower is a self-supporting or cantilevered structure, while a mast is held up by stays or guys.

The self-supported lattice is the most widespread form of construction. It provides high strength, low weight and low wind resistance, and is economic in its use of materials. Lattices of triangular cross-section are most common, and square lattices are also widely used. Guyed lattice masts are also often used; the supporting guy lines carry lateral forces such as wind loads, allowing the mast to be very narrow and of modular construction. The entire structure is constructed by creating a series of horizontal ladders, or internal triangular structures, that secure the tower's three, or four base legs. Guyed masts are also constructed out of steel tubes.

Last but not least, monopole rooftop masts (which may be covered with camouflage and/or a radome) have been installed on top of many buildings. With the advent of urban mobile communications, developers wanted a more efficient way to construct and operate low-height elevation systems for aesthetic reasons. They conceived the idea of the monopole rooftop configuration, a lattice mast with a pole on top used for antenna mounting. These configurations became more fashionable, once alternative construction materials began to exhibit greater strength and flexibility without failing. Today these free-standing masts are fabricated from various materials.

In order to install on towers and masts the antennas at specified direction with respect to North (azimuth alignment) and the earth's centre of gravity (tilt alignment), the industry adopted the engineering and design of antenna azimuth and tilt mounting brackets.

The antenna tilt bracket is a standard antenna accessory, delivered with the specific antenna purchased, and as such we will not further describe the various types of tilt bracket here. The most common type of antenna azimuth bracket in the field comprises a set of collars that are mounted on one side at the antenna tilt bracket and on the other side are fixed on a pole. Azimuth alignment is performed by loosening the collars, aligning the antenna and tightening the collars on the pole. More sophisticated antenna azimuth brackets are described in detail in the applicant's co-pending applications published as WO2019/110697 (incorporated by reference where possible).

Radio coverage of each antenna needs to be decided according to radio planning criteria.

On a typical 3-sector site, each directional antenna needs to be capable of 120 degrees azimuth and 20 degrees tilt range (10 degrees up-tilt and 10 degrees down-tilt). Even fully equipped with both azimuth and tilt brackets, an antenna cannot be directly installed on the mast structure and still be capable of full movement in both azimuth and tilt directions. The main reason for that is the fact that modern cellular antenna geometry (panel type) are bulky, long (may reach up to 3 meters length), wide (may be more than half a meter wide) and heavy (may weight more than 50 kgs); not to be mentioned that over a dozen coaxial cables are mounted on the bottom of the antenna that cannot be over-bended, especially when the antenna is to be down-tilted.

Using the well-known set of collars for performing azimuth steering and alignment, the antenna always needs to be mounted on a mast's structural member that is of circular shape, is capable of supporting the excessive weight and wind-load and of course has the required clearance from other antennas and the structure itself for azimuth alignment according to radio planning instructions (i.e. at least the first Fresnel zone should be always kept free of obstacles). This should be the case for pole masts, as poles are of circular shape and their main structural member is the pole itself, however, taking into account that usually 3 antennas (for a 3-sector site), half a meter wide and with azimuth range freedom of 120 degrees each are to be installed on the pole's top, the pole should have more than 1 meter diameter in order to perform. Using such poles for the purpose, is not only expensive but also impractical (most of the times impossible) to implement. The situation is complicated further when the pole is to be supported by wires.

Considering the known requirements for antenna mounting:

i. The antenna needs to be tightly secured, collinearly on a vertical structural member, otherwise the antenna reflector/backplane will twist. Geometric deformation of the antenna's reflector impacts its radiation performance, which is undesirable.

ii. The antenna needs to be tightly secured with a baseline orientation perpendicular to the ground, otherwise both tilt and roll antenna dimensions will be offset from the global reference plane, which is the earth's centre of gravity.

iii. The mast vertical structural members have limited available surface area for antenna mounting because the horizontal and diagonal cross-members are fixed to them in close patterns, and cannot be removed. The situation is further complicated when the lattice mast is to be supported by wires.

iv. The antenna's vertical spacing of its top and bottom mounting points are fixed in position, which makes it very likely to coincide with the horizontal and diagonal cross-member mounting points on the mast vertical structural members. The situation is further complicated when the lattice mast is to be supported by wires.

v. The vertical members the antennas are attached to always need to have circular shape when using the well-known set of collars for performing antenna azimuth steering and alignment. This is not the case for the majority of lattice mast configurations.

vi. An antenna of around three metres length and half a metre width needs to be placed spaced apart from the mast section on the horizontal plane in order to achieve azimuth steering of 120° range and tilt inclination of 20° range (up-tilt or down-tilt) without clashing on the mast structural members or other tower-top equipment installed.

After installation completion, it should be ensured that the antenna's first Fresnel zone is free of obstacles. Fresnel zone clearance is used to analyze interference by obstacles near the path of the antenna's main radiation beam. In establishing Fresnel zones, one needs to first determine the RF Line of Sight (RF LoS), which in simple terms is a straight line between the transmitting and receiving antennas. The zone surrounding the RF LoS is the Fresnel zone.

Having all these requirements in mind, the industry adopted the engineering and design of a universal antenna "support system" that could be installed without implementation problems on both pole and lattice masts while being capable for antenna azimuth and tilt alignment in order to satisfy both the structural engineering requirements and the radio planning instructions.

An example of a legacy antenna "support system" adopted by the industry is shown in FIGS. 1*a* and 1*b*.

Referring to FIG. 1*a* there is shown a cellular antenna monopole 2 comprising a vertical upright member. The monopole is a hollow, cylindrical mast member.

The support system 10 comprises a pair of pole spacing supports 12, 14. Each support 12, 14 comprises an elongate metal beam 16 welded on respective ends to mast clamps 30 and pole clamps 20. The mast clamps 30 are attached to the monopole 2 by clamping. The pole spacing supports 12, 14 are attached to the mast at two spaced-apart vertical positions allowing for a minimum specified spacing of a pole 22 and antenna 24 from the cellular antenna mast 2. The antenna pole 22 is inserted through the pole clamps 20 of both pole spacing supports 12, 14 and clamped therein. The antenna pole 22 defines an antenna azimuth steering axis Z.

Allowing for the required spacing from the mast to be achieved, the pole spacing supports 12, 14 are also configured to allow the riggers to physically install the antenna, and set it at the desired azimuth and tilt direction. Antenna tilt brackets 26, 28 are installed each on pole 22. The antenna tilt brackets comprise azimuth collars 27, 29 that clamp the pole 22 and permit selective rotation about the steering axis Z. The collars 27, 29 of the mechanical tilt brackets can be tightened to inhibit antenna rotation about the azimuth steering axis. The mechanical tilt brackets 26, 28 also rotate the antenna in the vertical plane about a horizontal axis (inclination).

In this way, the industry adopted the engineering and design of a universal antenna "support system" that could be installed without implementation problems on both pole and lattice masts while being capable for antenna azimuth and tilt alignment in order to satisfy both the structural engineering requirements and the radio planning instructions.

However, there are several problems with this approach.

Firstly, the pole spacing supports 12, 14, the mast clamps 30, the pole clamps 20, and also the pole 22 are all machined hot-dipped galvanized steel. Each needs to be individually constructed and selected according to the installation requirements of each tower.

Due to weight, the legacy antenna "support" also presents a negative environmental footprint (caused by the unnecessary galvanized steel deployed for antenna mounting). This unnecessary weight directly translates into increased CO2 emissions into the environment. 5G technology itself is characterized by high energy consumption and there is a need for mobile network operators to reduce their environmental footprint.

Secondly, the legacy antenna "support" system installation is complex, as it needs to take place in three discrete phases:

i. The first phase requires the antenna "support" system to be installed on the mast's vertical upright member 2;

ii. the second phase requires the antenna and its azimuth and tilt brackets 26, 28 to be installed on the antenna "support" (and specifically on pole 22); and, iii. the third phase requires the antenna azimuth and tilt alignment to be performed on the spot.

This is clearly undesirable due to the large amount of time it takes the riggers to perform such an installation. Longer times of specialized personnel (like riggers) on the tower-top, negatively impacts installation costs, revenues (increased site-down-time) and has health and safety at work implications.

Thirdly, although the main reason that the engineering and design of the legacy universal antenna "support" system is the antenna alignment capability it provides (azimuth and tilt), both azimuth and tilt alignment is performed at tower-top with unknown accuracy and precision. Antenna azimuth alignment is still performed with the use of collars 27, 29 which are not calibrated for azimuth and tilt steering (thus presenting systematic errors), operated by a person (rigger) that also adds random errors in the alignment process on top of the systematic errors. Any deviation between the actual vs the instructed antenna positioning on the mast is clearly undesirable as it may impact coverage, capacity and quality of cell-site wireless connections.

Fourthly, prior art installations typically have a large effective projected area (EPA). The EPA is the total wind loading area of the antenna system (antenna and mounting bracket). The minimum tower-top wind loading would be achieved if the antenna system EPA would be reduced. In legacy systems, the antenna EPA is calculated as the sum of the antenna EPA and the antenna bracket EPA at the wind direction. Therefore the antenna bracket (and in particularly the mounting pole) negatively contributes to the antenna system EPA. It is generally beneficial to reduce the antenna system EPA as it increases the tower's static performance. Increasing the tower's static performance is advantageous for tower loading capacity i.e. the capability of the tower to host more antennas and antenna near products on its top.

This is of extreme importance for tower companies that need to increase the 'tenancy ratio' on their towers.

Ideally, multiple antennas should be mounted on a single pole 22. Increased deployment of cellular services demands a higher density of antennas on towers and masts (i.e. 5G technology roll-out requires 5G technology antenna additions). The prior art systems are not configured to support more than one antenna. Their general configuration provides that each antenna has an azimuth rotation axis Z which is coincident with the pole 22. Therefore, positioning multiple antennas on a common pole, with a common rotational axis would result in clashes should the antennas need to be adjusted to be directed in similar, or the same direction (common case when aligning 4G and 5G technology antennas to cover the same geo area).

Applicant's published application WO 2021/074335 A1 discloses various pole clamps using universal components.

One aim of the present invention is to provide a mounting system that facilitates an increase in antenna density and capacity for legacy monopole masts. Another aim is to provide a mounting system which may replace the legacy bracket.

SUMMARY OF INVENTION

According to a first aspect of the present invention there is provided an antenna support system (100) comprising:

- a first antenna mounting assembly (102) comprising:
- a first side subassembly comprising;
- a first clamping plate (148);
- a second clamping plate;
- a first mounting member (110) disposed between and attached to the first and second clamping plates such that the mounting member is perpendicular to the first and second clamping plates; and,
- an azimuth steering unit (106) supported by the mounting member;
- a second side subassembly comprising;
- a first clamping member (146); and,
- first and second mechanical fasteners (120, 122) configured to join the first side subassembly and the second side subassembly either side of a support member (22) to thereby clamp the first antenna mounting assembly to the support member in use.

Advantageously the present invention provides the ability to increase the antennas attached to a single legacy pole—in particular if those antennas are steerable in the azimuth plane. The clamping plates are planar and mounted perpendicular to the pole, such that the plane of the first mounting member (which may be an extruded universal mounting plate such as that described in WO2021/074335) is parallel to the support member.

If the support member is tapered, the clamping plates are selected such that the first mounting member is perpendicular to the ground. If more than one mounting member is used (double mounting) in a vertical direction (i.e. at either end of an elongate antenna), both mounting members are aligned in a way to be perpendicular to the ground, and the steering units are aligned coaxially.

Preferably the first and second clamping plates are offset along a main axis (P) of the support member (22) in use.

Preferably:

- the second side subassembly comprises a further first clamping plate (146) and a further second clamping plate;
- the further first clamping plate is co-planar with the first clamping plate (148);
- the further second clamping plate is co-planar with the second clamping plate; and,
- the first clamping plate and further first clamping plate are attached by the first and second mechanical fasteners; and the second clamping plate and further second clamping plate are attached by further first and further second mechanical fasteners.

Preferably the second side subassembly comprises:

- a second mounting member disposed between and attached to the further first and further second clamping plates such that the mounting member is perpendicular to the further first and further second clamping plates; and,
- a further azimuth steering unit (106) supported by the further mounting member.

Preferably:

- the first clamping plate and further first clamping plate are mirror images of each other; and,
- the second clamping plate and further second clamping plate are mirror images of each other.

Preferably the first and second clamping plates each define an edge profile that is shaped to mate with the support member.

If the support member is tapered, the first and second clamping plates are different, to allow the mounting members to be aligned and perpendicular to the ground level (parallel to the member axis).

Preferably the first and second clamping plates each define a concave edge profile for receiving the support member.

Preferably the first and second clamping plates are identical when to be used on non-tapered support members.

Preferably the first and second clamping plates each define a clamping portion for engagement with the support member, and an arm extending therefrom in which the first mounting member is attached between the arms of the first and second clamping plates.

Preferably:

- the first side subassembly and the second side subassembly are configured to clamp the support member therebetween; and,
- the first side subassembly and the second side subassembly are connected at two spaced-apart positions on either side of a main axis of the support member.

Preferably the first side subassembly and the second side subassembly are connected at two spaced-apart positions on a line extending through the main axis.

Preferably the support member is circular in cross-section.

Preferably there is provided a second antenna mounting assembly offset along the main axis of the support member.

Preferably there is provided an antenna attached to the steering units of the first and second antenna mounting assemblies.

Preferably there is provided:

- an offset pole subassembly comprising:
- a first pole support;
- a second pole support;
- a pole;
- wherein the first and second pole supports are configured to support the pole at a position offset from a mast member in use;
- an antenna support system according to the first aspect wherein the pole is the support member.

According to a second aspect of the invention there is provided a method of installing a cellular antenna comprising the steps of:

providing a support member having a main axis;

providing first and second antenna support systems according to the first aspect;

attaching the first and second antenna support systems to the support member at spaced-apart positions along the support member;

attaching a first cellular antenna to the first and second antenna support systems to rotate about a first azimuth steering axis offset from the support member in use.

Preferably the method comprises the step of:

attaching a second cellular antenna to the first and second antenna support systems to rotate about a second azimuth steering axis offset from the support member in use.

BRIEF DESCRIPTION OF DRAWINGS

An embodiment of the present invention will now be described with reference to the following figures in which.

DESCRIPTION OF THE FIRST EMBODIMENT

FIGS. 2*a* to 2*f* show a first embodiment of an antenna mounting system in accordance with the present invention.

Configuration

Figure 1A:
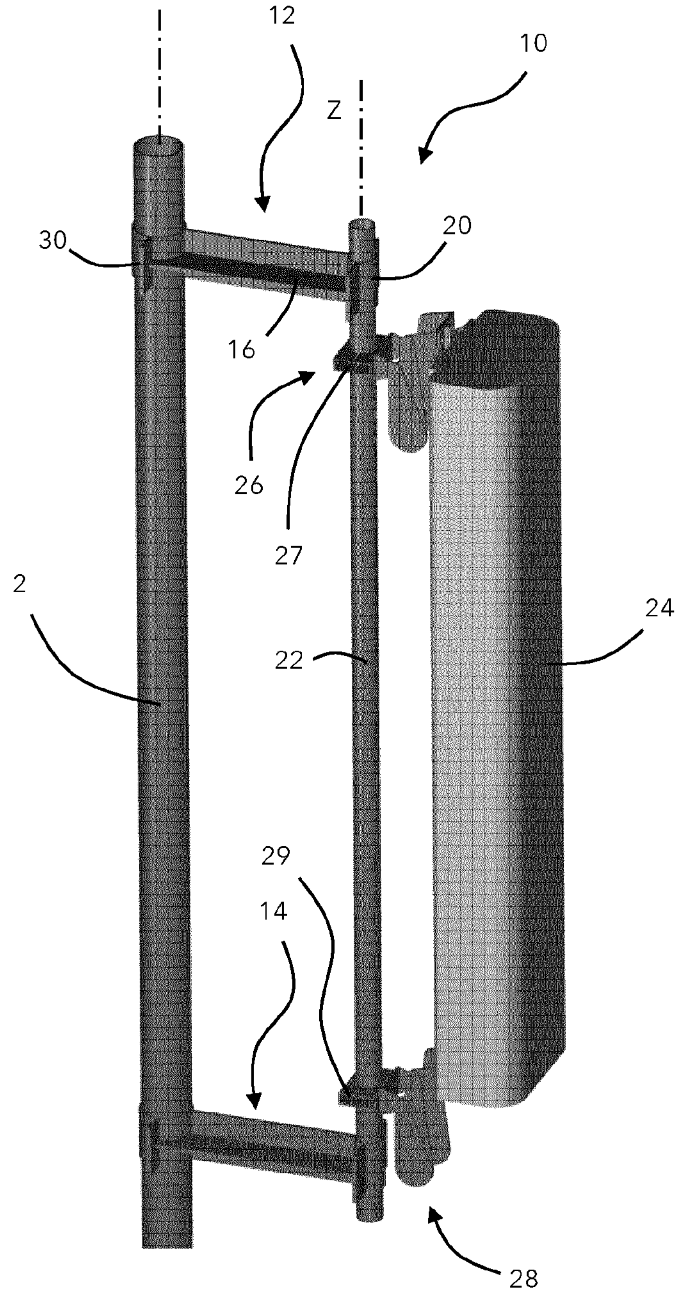
Fig. 1a PRIOR ART
FIG. 1*a* is a perspective view of a prior art antenna mounting system.
Figure 1B:
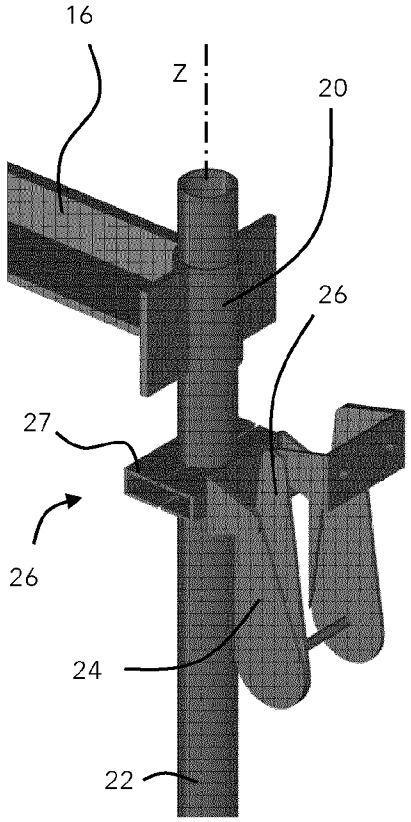
Fig. 1b PRIOR ART
FIG. 1*b* is a detail view of a part of FIG. 1*a;*
Figure 2A:
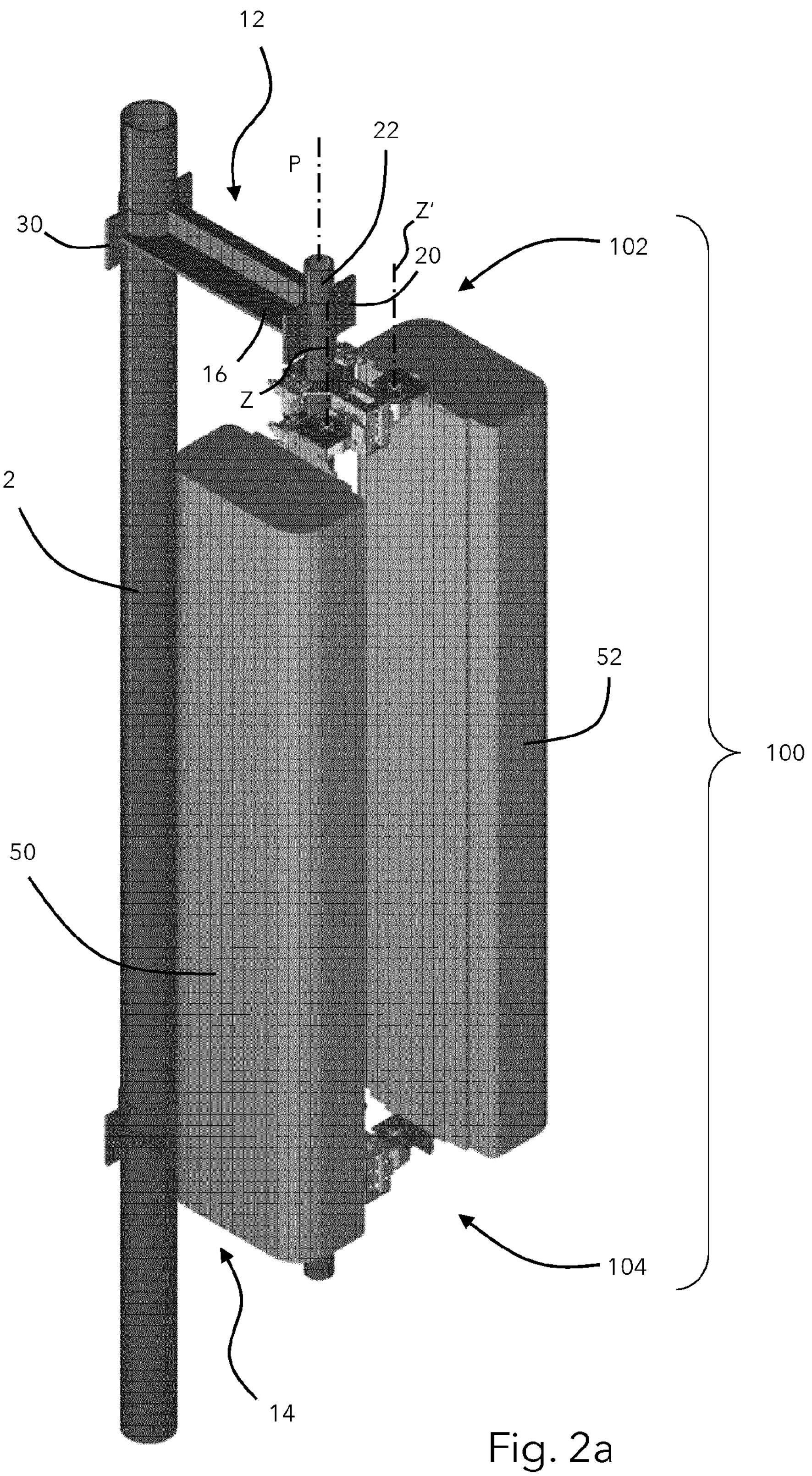
FIG. 2*a* is a perspective view of a first antenna mounting system in accordance with the present invention.

As can be seen in FIG. 2*a*, the present invention is suitable for installation on legacy "offset pole" arrangement. Therefore, FIG. 2*a* shows a cellular antenna monopole 2 comprising a vertical upright member. The monopole is a hollow, cylindrical mast member.

The legacy offset pole arrangement comprises a pair of pole spacing supports 12, 14. Each support 12, 14 comprises an elongate metal beam 16 welded on respective ends to mast clamps 30 and pole clamps 20. The mast clamps 30 are attached to the monopole 2 by clamping. The pole spacing supports 12, 14 are attached to the mast at two spaced-apart vertical positions allowing for a minimum specified spacing of a pole 22 from the cellular antenna mast 2. The antenna pole 22 is inserted through the pole clamps 20 of both pole spacing supports 12, 14 and clamped therein. The antenna pole 22 defines a pole axis P (which in the prior art was also the azimuth steering axis Z).

Figure 2B:
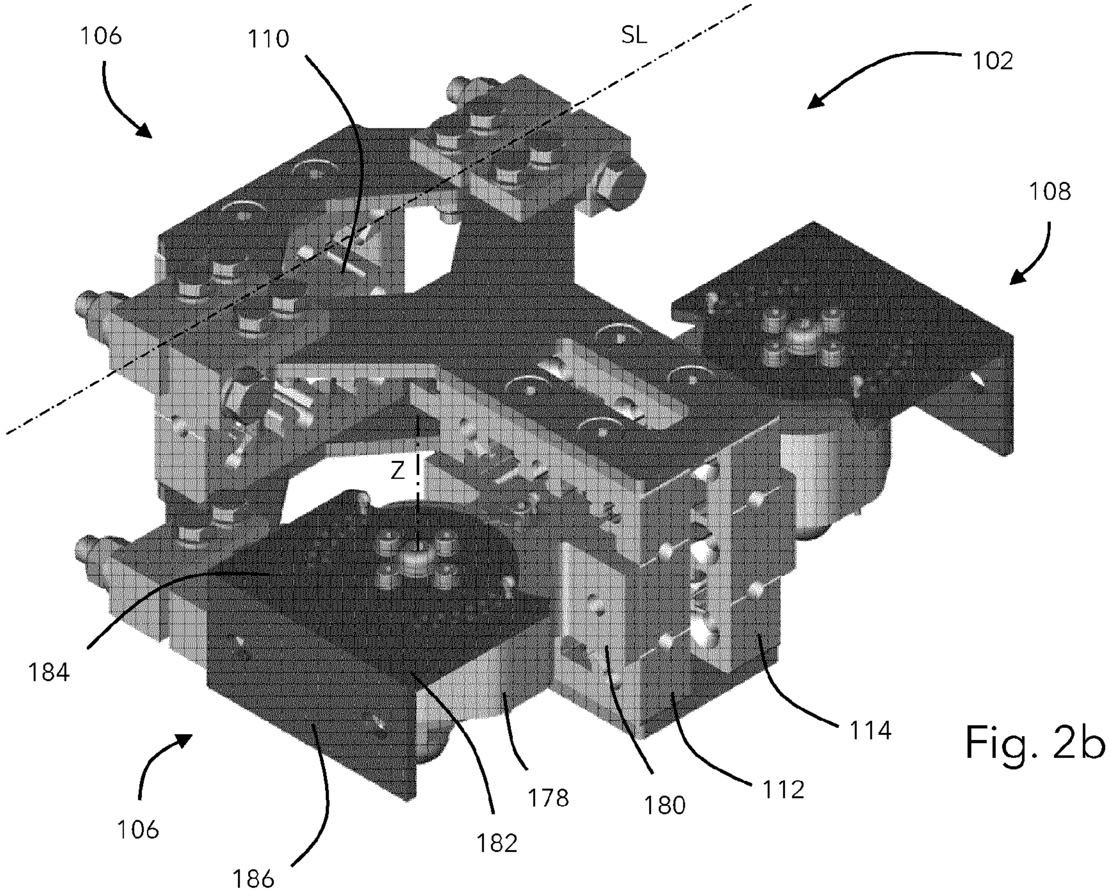
FIGS. 2*b* and 2*c* are perspective views of subassemblies of the mounting system of FIG. 2*a;*
Figure 2C:
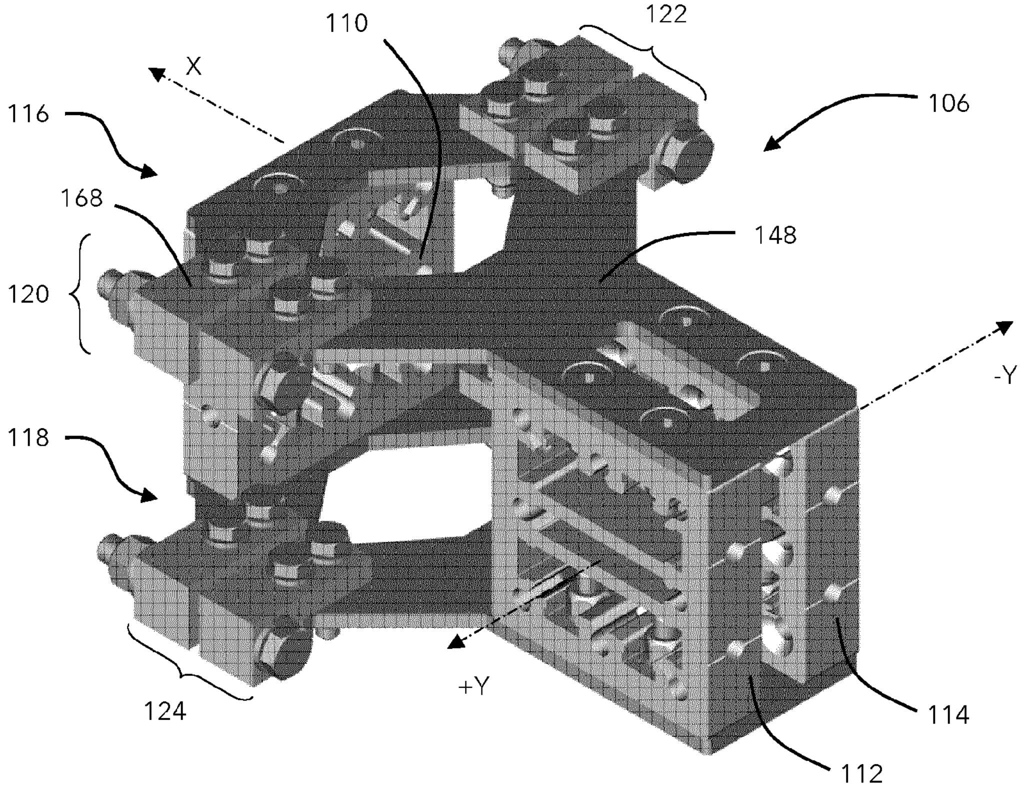

FIGS. 2*a* to 2*c* show an antenna mounting system 100 comprising first and second spaced-apart antenna mounting assemblies 102, 104. Two antennas 50, 52 are supported on the system 100.

Referring to FIGS. 2*b* and 2*c*, the assembly 102 is shown. It will be understood that the assembly 104 is identical and as such will not be described separately.

A pair of spaced-apart azimuth steering and locking units 106, 108 are attached (FIG. 2*b*) are attached to the assembly 102 of FIG. 2*c*.

The assembly 102 comprises first, second a third universal plates 110, 112, 114, an upper plate assembly 116, a lower plate assembly 118 and four sets of clamp brackets 120, 122, 124, 126.

Figure 2D:
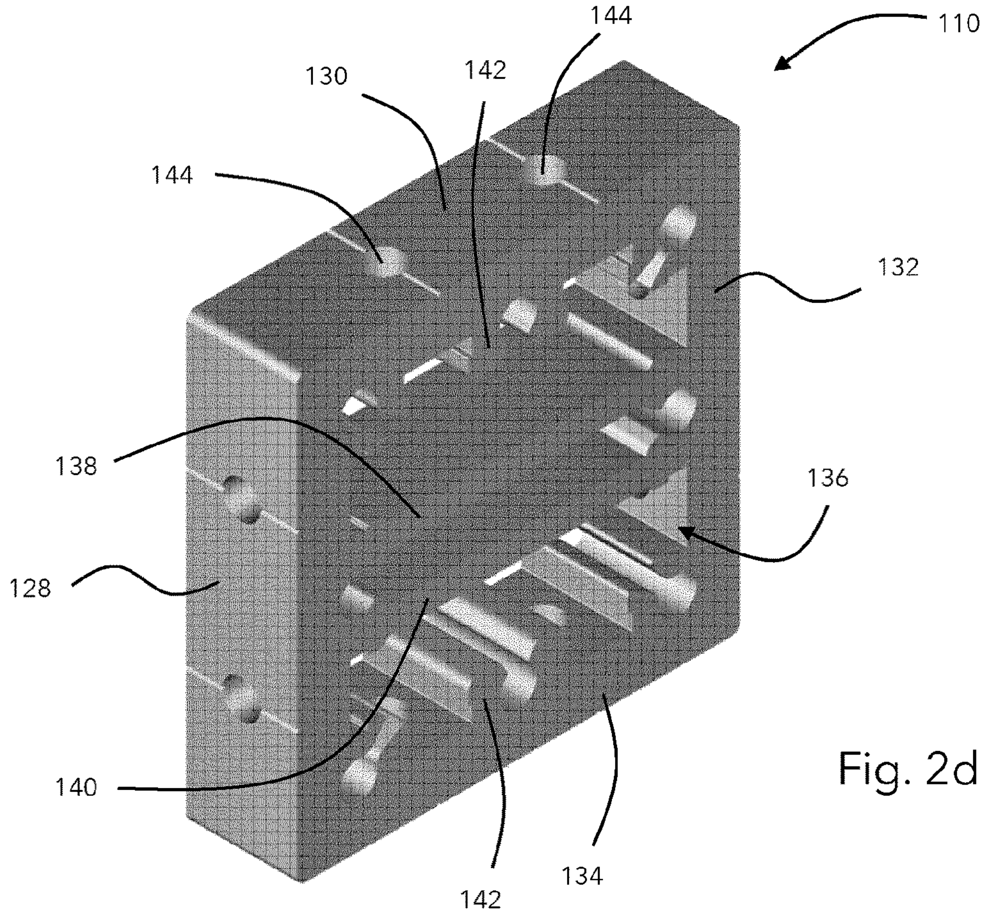
FIGS. 2*d* to 2*f* are perspective views of components of the mounting system of FIG. 2*a;*
Figure 2E:
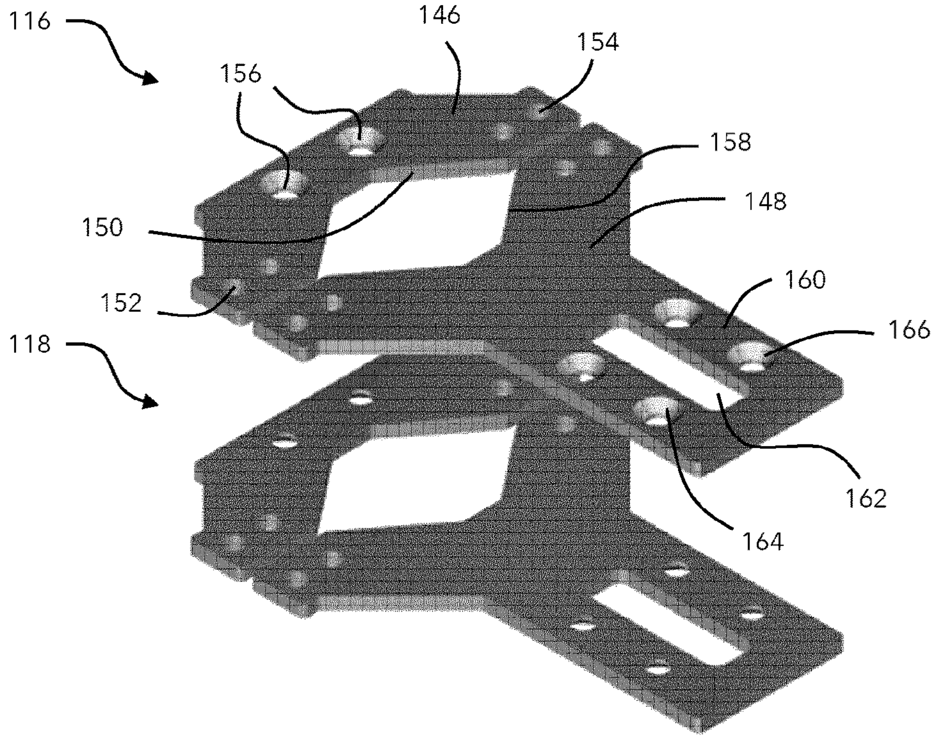

The universal plates 110, 112, 114 are identical and as such only the plate 110 is shown in FIG. 2*d*. The plate 110 is an extruded aluminium component which is generally square in shape having sides 128, 130, 132, 134. The plate 110 has a central throughbore 136 having a pair of offset parallel ribs 138, 140 extending between the sides 128, 132. The inner periphery of the plate 110 has a plurality of bosses 142 defined thereon being configured to receive the shafts of mechanical fasteners. The sides 128, 130, 132, 134 each have a pair of through-bores 144 to receive mechanical fasteners.

The upper and lower plate assemblies 116, 118 (FIG. 2*e*) each comprise a first plate 146 and a second plate 148. The plate 146 is generally U-shaped comprising a concave edge 150. A respective pair of clamp bracket openings 152, 154 are provided at each end of the plate 146, and a pair of countersunk universal plate openings 156 at the centre of the first plate 146.

The second plate 148 is similar to the first plate 146 having a concave edge 158, but also has a projecting arm 160 extending opposite to the concavity and radially therefrom. The arm 160 defines an elongate central opening 162 and two respective pairs of countersunk universal plate openings 164, 166 on either side.

Figure 2F:
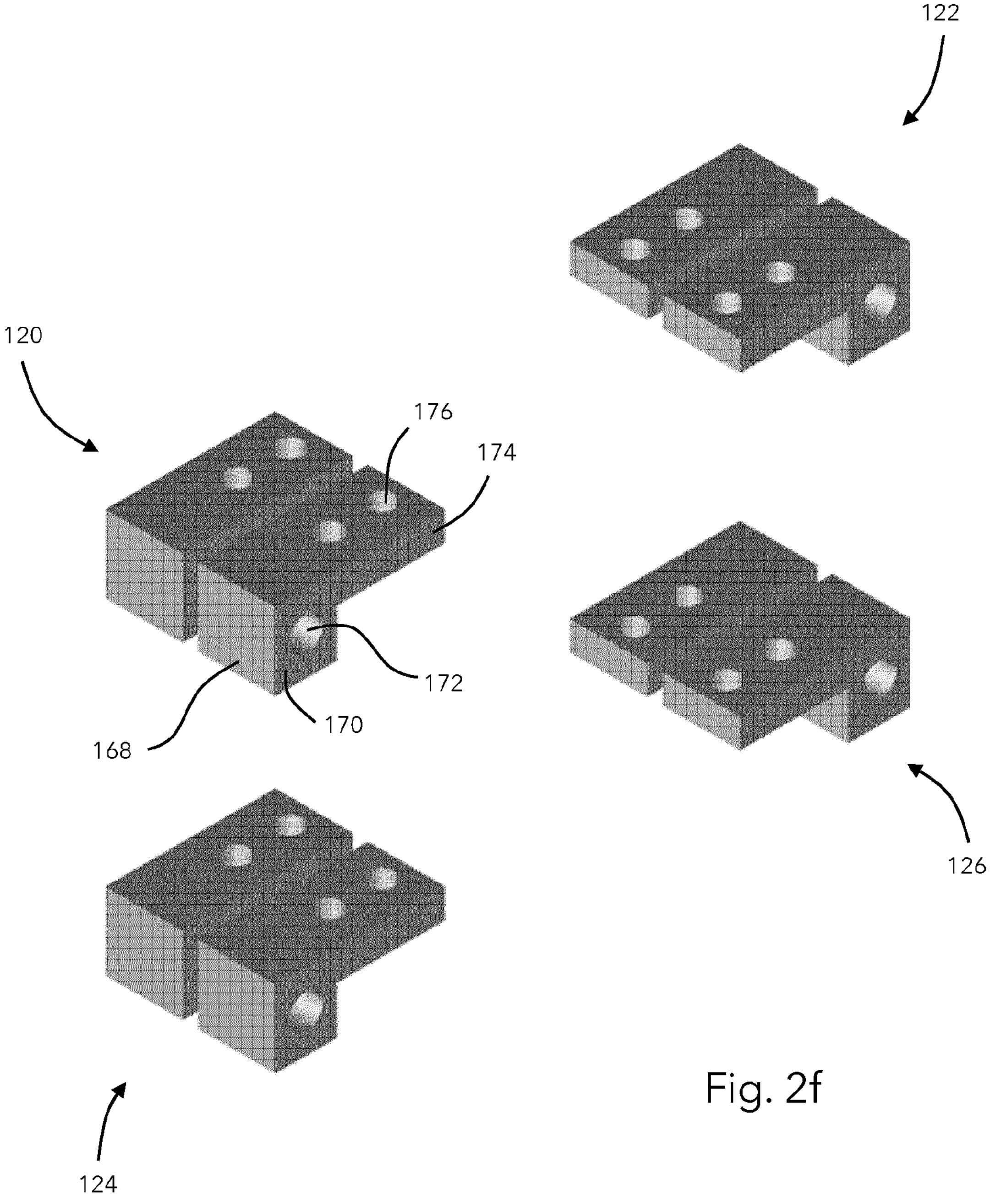

The sets of clamp brackets 120, 122, 124, 126 are shown in FIG. 2*f*. Each set comprises two identical clamp brackets 168. The clamp brackets 168 are unitary comprising a boss 170 having a through-bore 172, and a flange 174 having two through-bores 176 normal to the bore 172.

Referring to FIG. 2*b*, each of the azimuth steering and locking units 106, 108 comprises a body 178 connected to a flange 180. The body 178 encloses a rotary joint having a steering axis Z. Attach to the joint is an antenna mounting bracket 182 having a locking plate 184 and a mounting plate 186. The mounting bracket is configured to rotate relative to the body about the steering axis Z. The locking plate 184 comprises a plurality of through holes by means which it can be locked to the body 178 to inhibit rotation via a locking pin. Therefore the units 106, 108 can be steered to a suitable position and locked in place. In other embodiments, the units 106, 108 may be electrically driven by a motor and/or electrically locked into position with a linear actuator.

Assembly

The assembly 102 is assembled in two parts.

In one part, the universal plate 110 is fastened between an upper and lower first plate 146 via mechanical fasteners engaging the countersunk universal plate openings 156 and the openings 144 of the universal plate. Thus the first plates 146 are parallel and offset. Clamp brackets 168 are attached to the extremities of the plates 146.

In the second part, the two universal plates 112, 114 are secured between two second plates 148 via mechanical fasteners engaging the countersunk universal plate openings 164, 166 and the openings 144 of the universal plates. The plates 112, 114 are positioned so as to be parallel and offset, extending along the arm 160. Clamp brackets 168 are attached to the extremities of the plates 148 either side of the concave edge 158.

The two parts now form a pole clamp. The pole 22 is positioned between the concave edges 150, 158 of each of the respective pairs of plates, and mechanical fasteners are used to secure the sets of clamp brackets 168 together via the bores 172. The pole section 22 is thereby clamped and the assembly held in position with the first universal plate 110 facing in a first horizontal direction X, and the two plates 112, 114 facing in opposite horizontal directions +Y and −Y, normal to X and Z.

The system only requires two sets of fasteners to be tightened to clamp the pole—there is a split line SL which intersects the pole axis.

The steering and locking assemblies are then attached to any of the universal plates 110, 112, 114, although in FIG. 2*b* they are shown attached only to the plates 112, 114. Antennas 50, 52 can be attached between the upper and lower assemblies 102, 104 for steering about their respective parallel and offset axes Z and Z' (FIG. 2*a*)

Use

The present invention facilitates an increase in antenna density on monopole masts. As demonstrated with respect to the first embodiment, a single legacy pole section 22 can be adapted to hold two antennas with offset and parallel azimuth steering axis (both of which are parallel to and offset from the pole axis P). This allows for each antenna 50, 52 to be steered to the appropriate position, and as the axes are offset allows for them to be pointed in approximately the same direction.

DESCRIPTION OF THE SECOND EMBODIMENT

Figure 3:
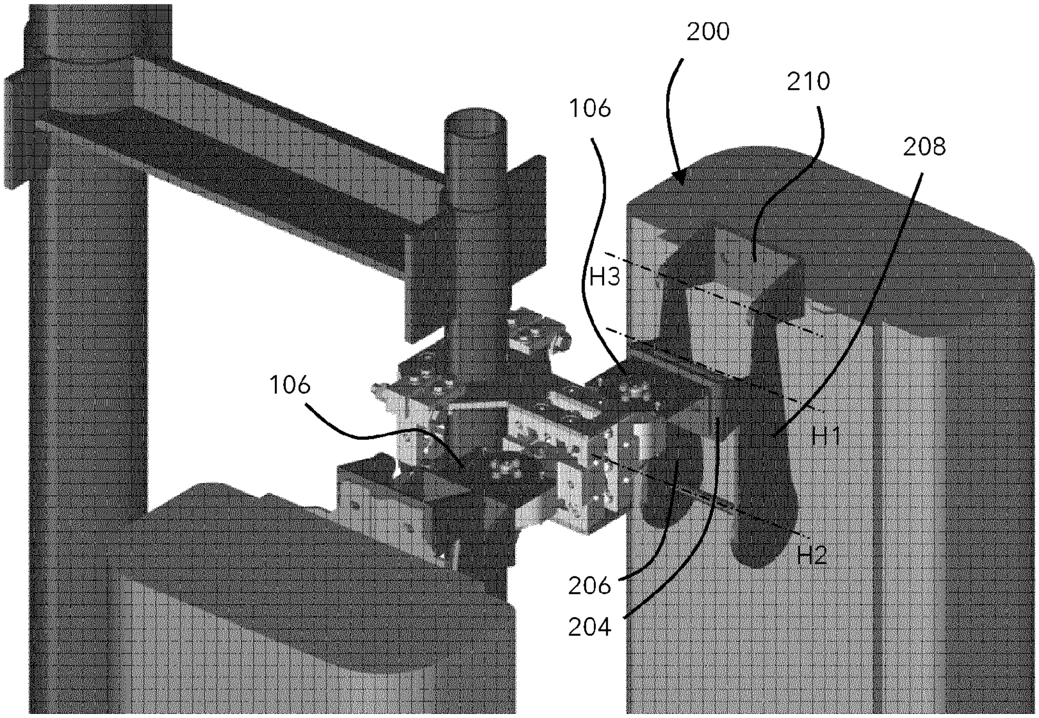
FIG. 3 is a perspective view of a second antenna mounting system in accordance with the present invention.

Referring to FIG. 3, a system similar to that shown in FIG. 2*a* is shown. The only difference is that the antennas 50, 52 are attached to the locking and steering units 106, 108 with tilt brackets 200. The tilt brackets 200 each have an attachment flange 204, a first arm 206 pivoted thereto about a first horizontal axis H1 and a second arm 208 pivoted to the first arm 206 about a second horizontal axis H2. An antenna attachment plate 210 is pivoted to the second arm 208 at a third horizontal axis H3. The brackets are provided at both the upper and lower mounting positions and as such can be used to tilt the antenna about a horizontal axis.

DESCRIPTION OF THE THIRD EMBODIMENT

Figure 4:
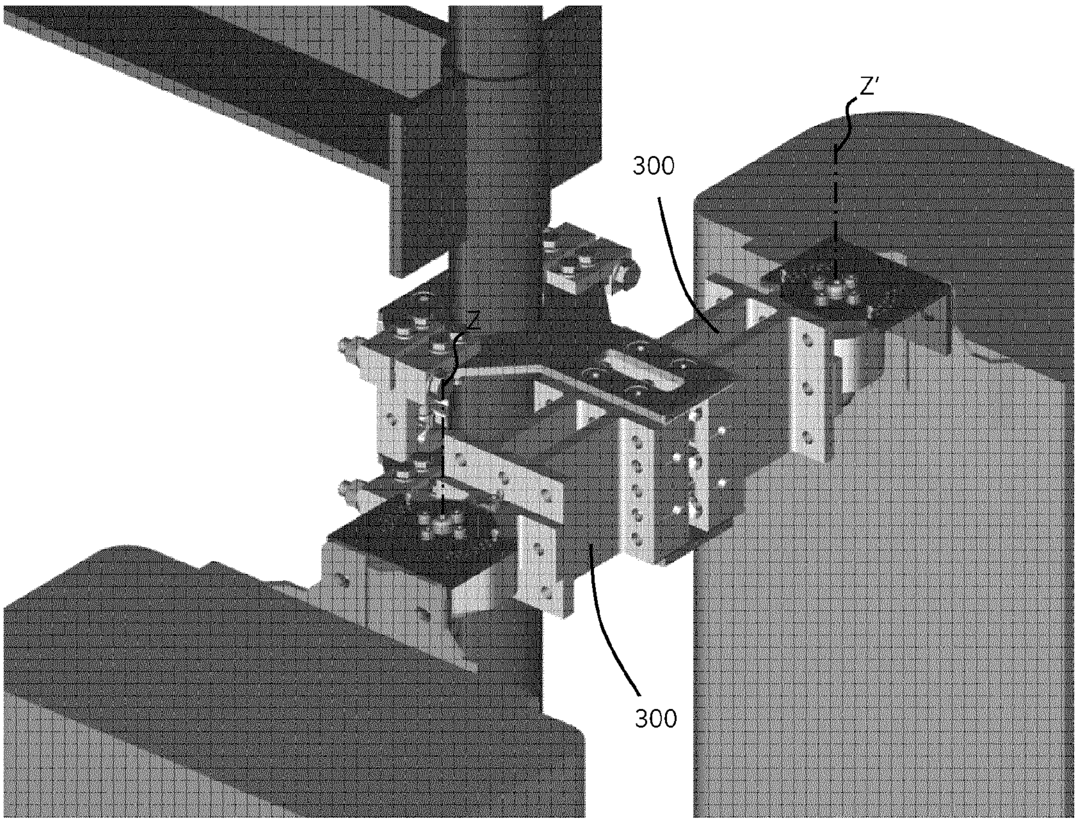
FIG. 4 is a perspective view of a third antenna mounting system in accordance with the present invention.

Referring to FIG. 4, a system similar to that shown in FIG. 2*a* is shown. The only difference is that the locking and steering units 106, 108 are attached to the universal plates with extensions 300. This increases the lateral distance between the azimuth steering axes Z, Z'.

DESCRIPTION OF THE FOURTH EMBODIMENT

Figure 5:
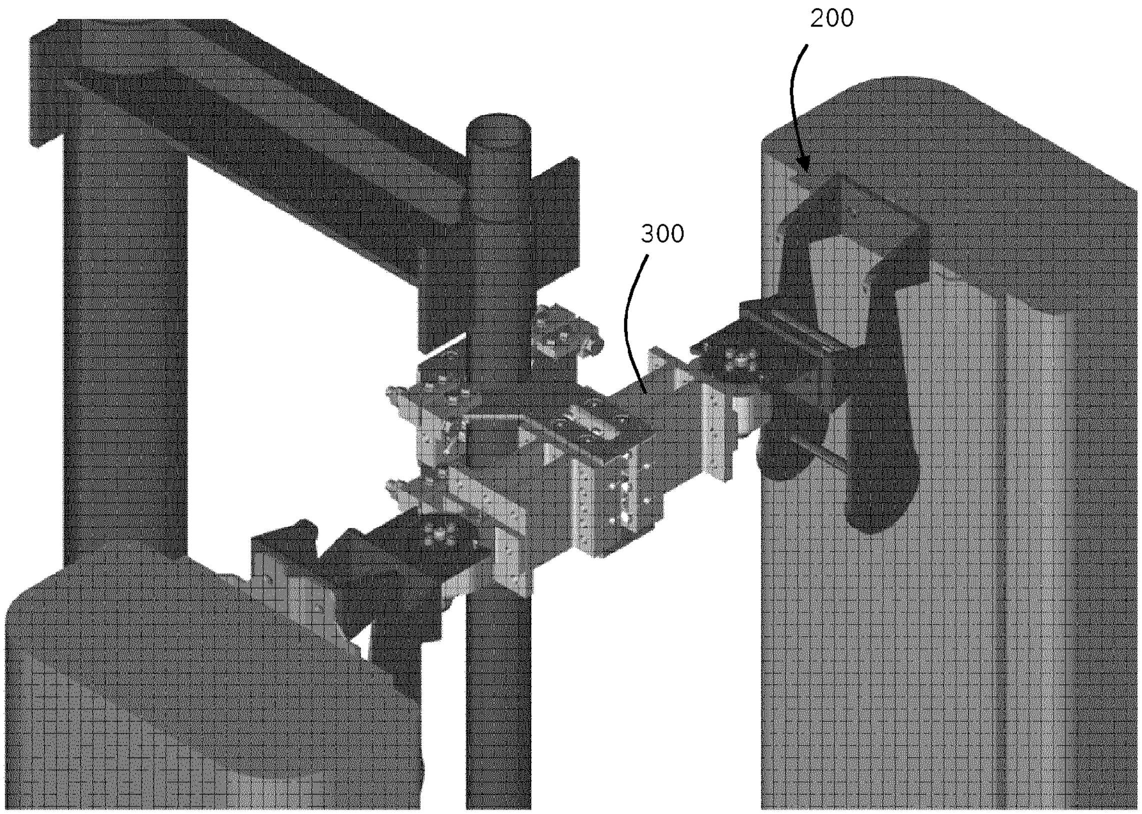
FIG. 5 is a perspective view of a fourth antenna mounting system in accordance with the present invention.

Referring to FIG. 5, the second and third embodiments are combined such that extensions 300 are provided with tilt brackets 200. Clearly, this modular approach introduces a high degree of flexibility to the system.

DESCRIPTION OF THE FIFTH EMBODIMENT

Figure 6:
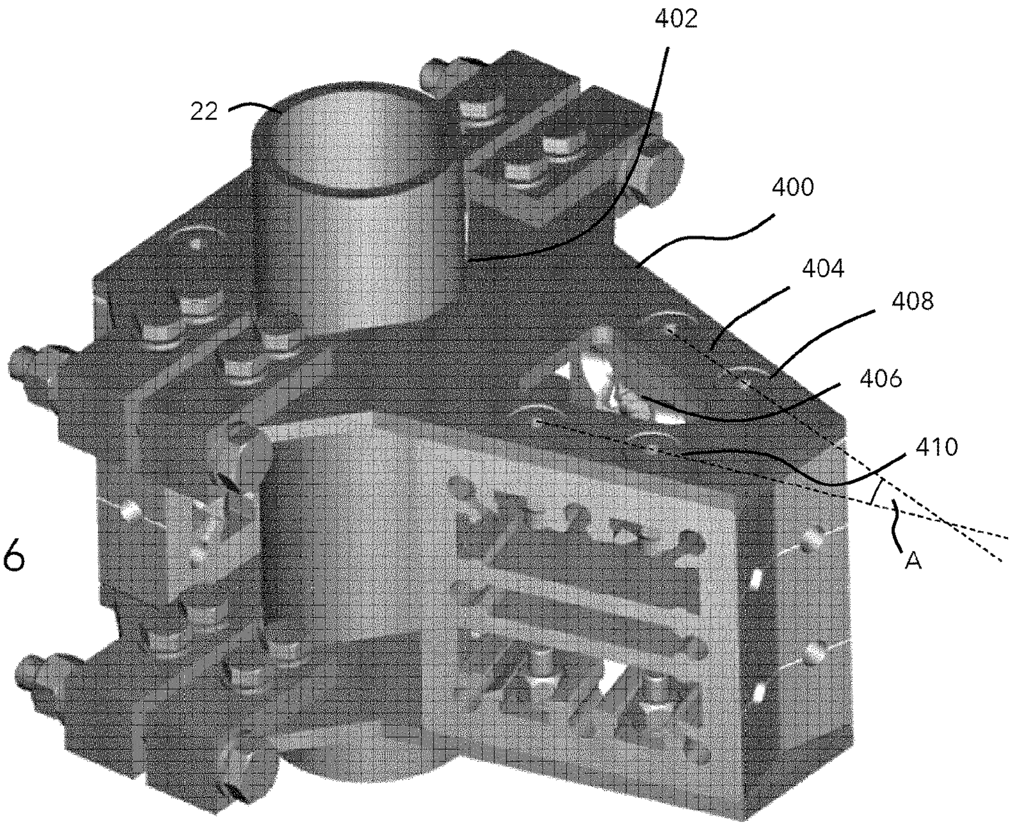
FIG. 6 is a perspective view of a fifth antenna mounting system in accordance with the present invention.

Referring to FIG. 6, a fifth embodiment of the present invention is shown. FIG. 6 can be compared to FIG. 2*c*, although it will be noted that the second plates 160 of the plate assemblies 116, 118 have been replaced with angle plates 400.

The second plates 400 have a concave edge 402, but a projecting arm 404 extending opposite to the concavity and radially therefrom is tapered. The arm 404 defines a triangular central opening 406 and two respective pairs of countersunk universal plate openings 408, 410 on either side. The openings 408, 410 are aligned on two converging lines such that when the universal plates 112, 114 are installed, they are at an angle A to each other.

DESCRIPTION OF THE SIXTH EMBODIMENT

Figure 7:
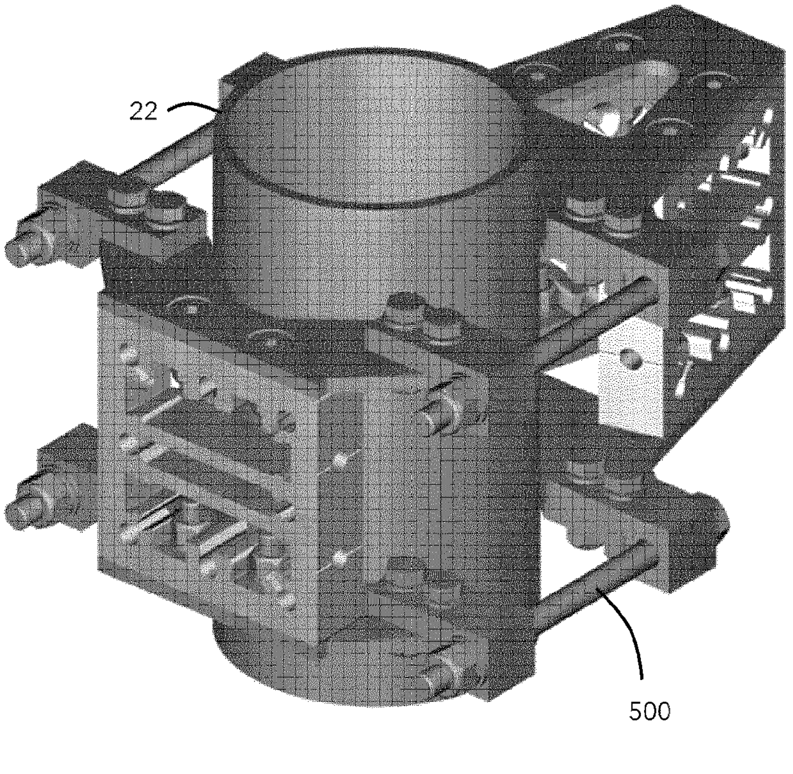
FIG. 7 is a perspective view of a sixth antenna mounting system in accordance with the present invention.

Referring to FIG. 7, a sixth embodiment of the present invention is shown. It is identical to the fifth embodiment with the exception that the pole section 22 is of a much larger diameter than the previous embodiments. In these circumstances, long bolts 500 are used to clamp the pole section 22.

DESCRIPTION OF THE SEVENTH EMBODIMENT

Figure 8:
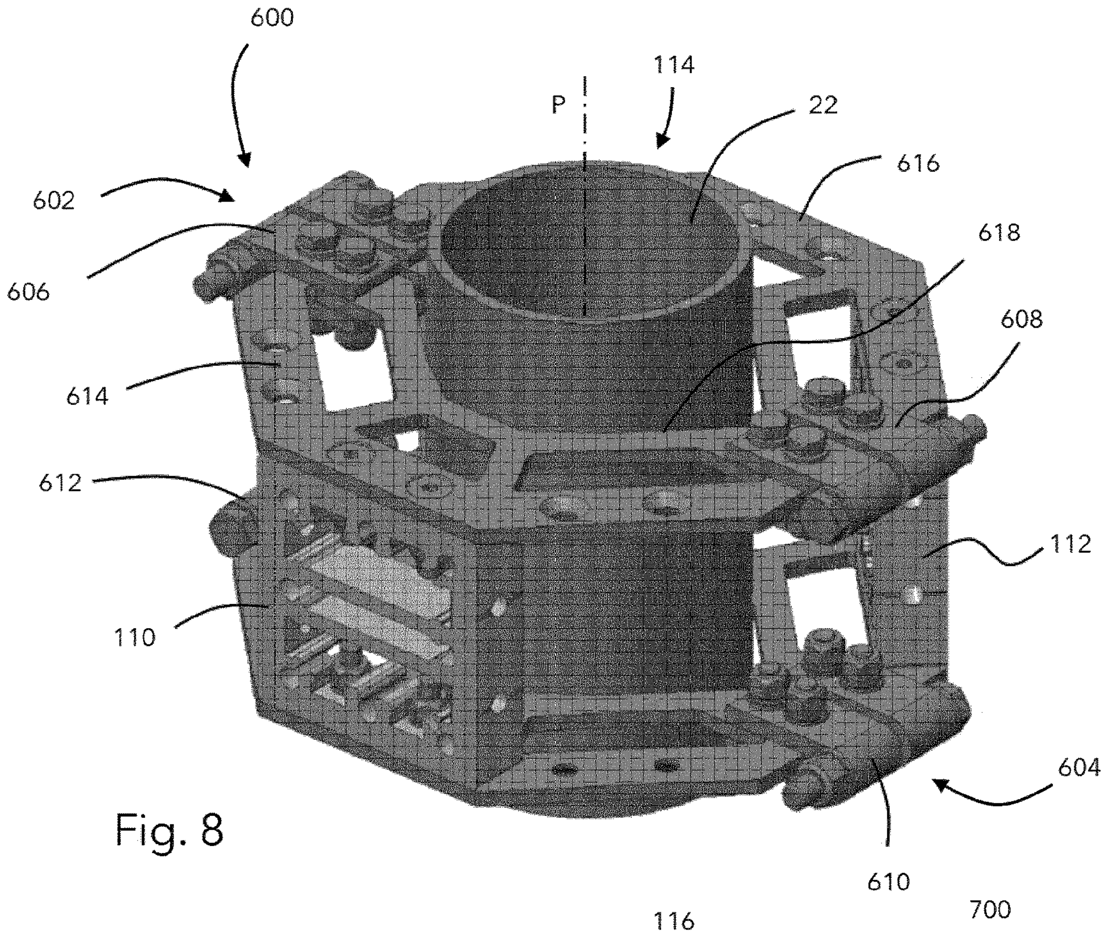
FIG. 8 is a perspective view of a seventh antenna mounting system in accordance with the present invention.

Referring to FIG. 8 as with the previous embodiments, the antenna pole 22 defines the pole axis P.

The antenna mounting system comprises two spaced-apart antenna mounting assemblies 600 (only one is shown).

The assembly 600 comprises first, second and third universal plates 110, 112, 114, an upper plate assembly 602, a lower plate assembly 604 and four sets of clamp brackets 606, 608, 610, 612.

The universal plates 110, 112, 114 are as described above with respect to the first embodiment.

The upper and lower plate assemblies 602, 604 each comprise a first plate 614 and a second plate 616. The plates 614, 616 are generally U-shaped each describing three sides of a hexagon, comprising a concave edge 618.

The sides of the semi-hexagonal plates 614, 616 are dimensioned to fit the universal plates, and as such each universal plate can be installed in any one of six positions. In FIG. 8, a plate 110 is installed between the upper and lower plate assemblies in the centre space, whereas the plate 112 is installed at a side space. Once the universal plates are installed, the two halves of the assembly 600 (each comprising a pair of plates 614 or a pair of plates 616 with universal plates disposed therebetween) can be secured together to clamp the pole 22 using the clamp brackets 606, 608, 610, 612.

DESCRIPTION OF THE EIGHTH EMBODIMENT

Figure 9:
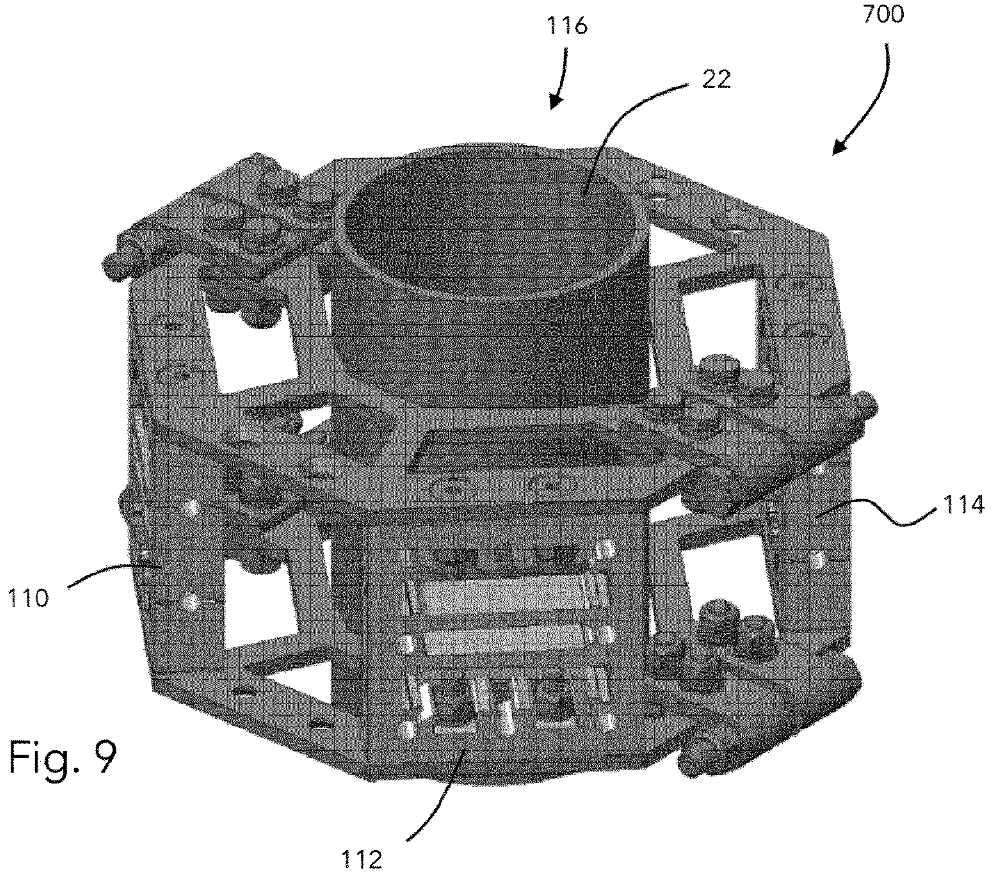
FIG. 9 is a perspective view of an eighth antenna mounting system in accordance with the present invention.

Referring to FIG. 9, an assembly 700 is identical to that of FIG. 8, except that four universal plates 110, 112, 114, 116 are disposed in the assembly—two on either side.

DESCRIPTION OF THE NINTH EMBODIMENT

Figure 10:
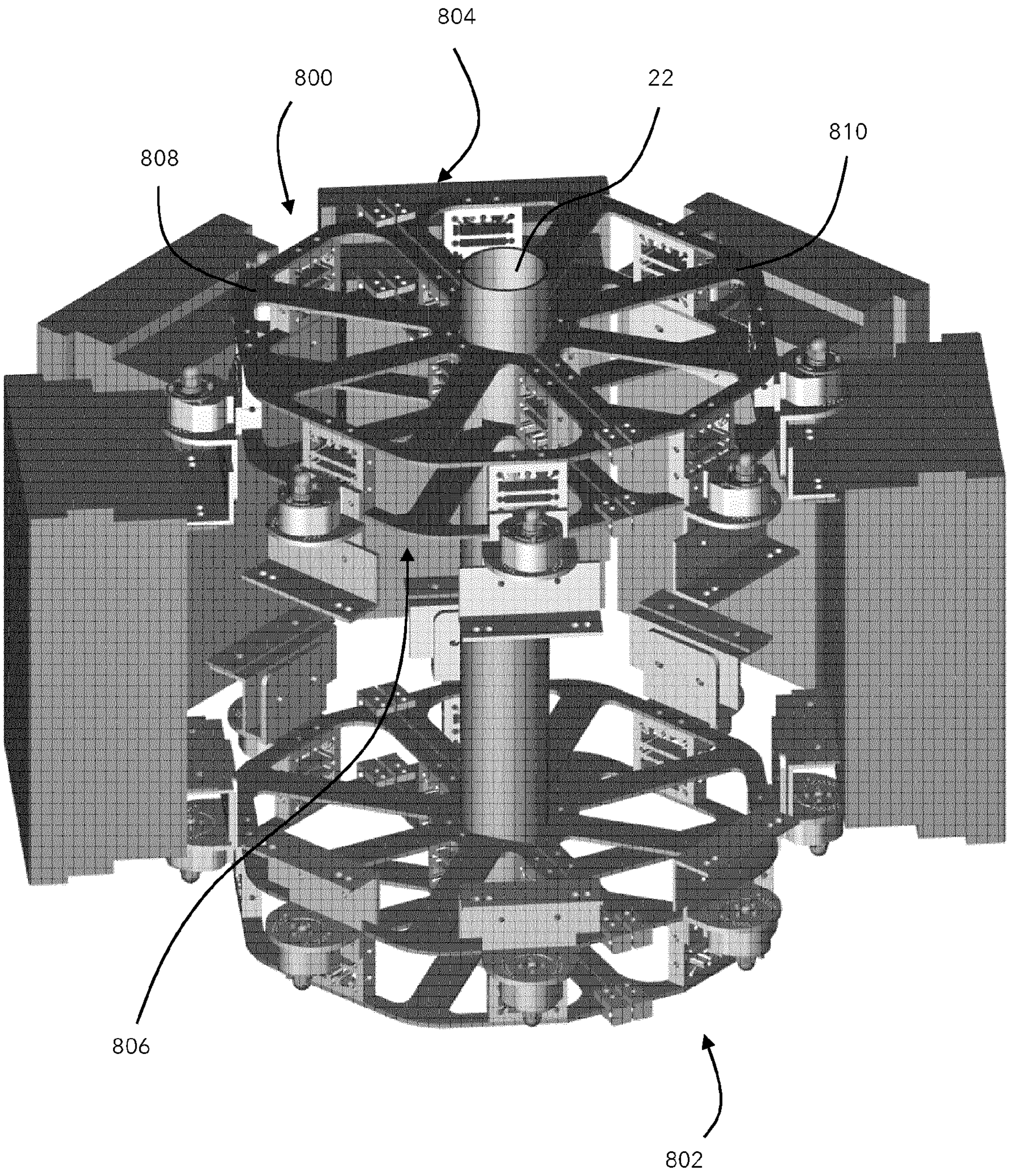
FIG. 10 is a perspective view of a ninth antenna mounting system in accordance with the present invention.

Referring to FIG. 10, two spaced-apart assemblies 800, 802 are shown supporting eight steering and locking units each, and a total of eight antennas are supported between the upper and lower assemblies 800, 802 on the pole 22.

In this embodiment, in each assembly there are two sets of plates 804, 806, each having first and second plates 808, 810 that clamp the pole 22. The plates 808, 810 are semi-octagonal in shape.

DESCRIPTION OF THE TENTH EMBODIMENT

Figure 11A:
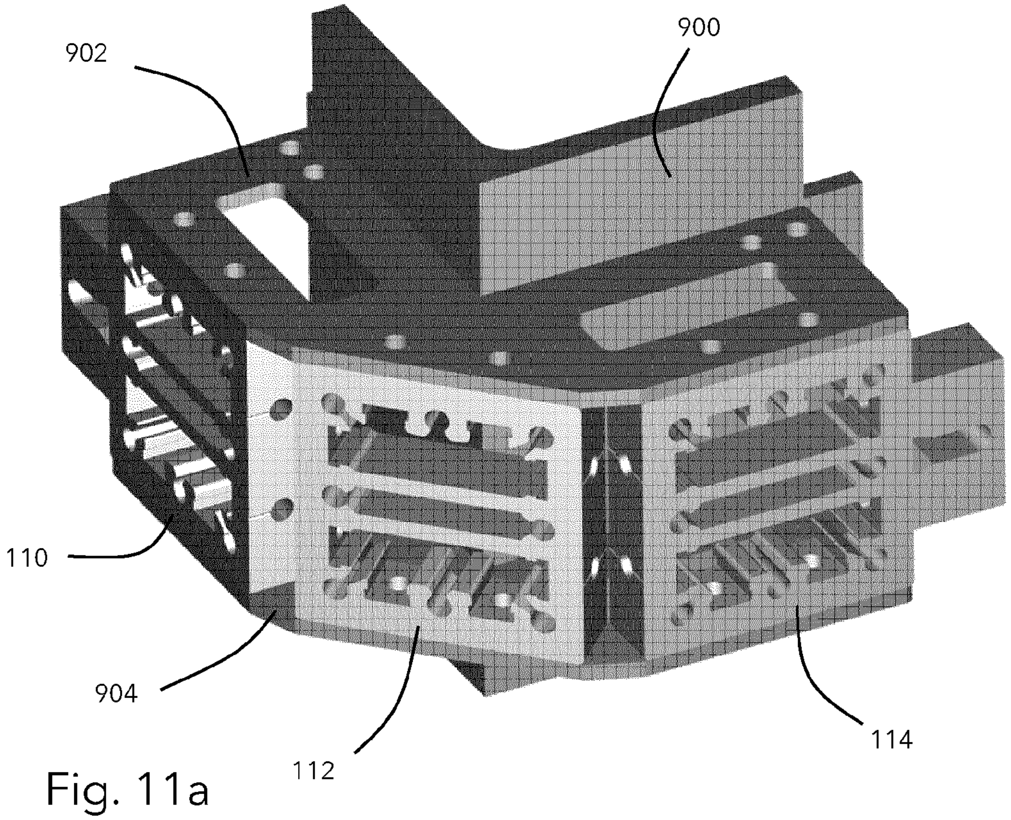
FIGS. 11*a* and 11*b* are perspective views of a tenth antenna mounting system in accordance with the present invention.
Figure 11B:
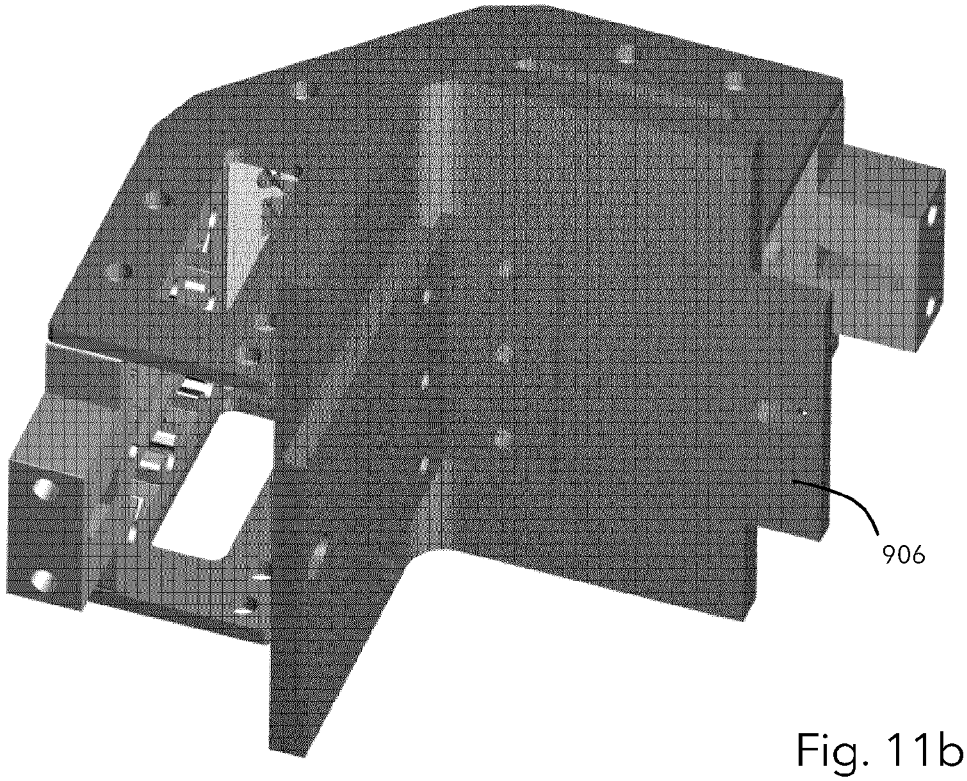

Referring to FIGS. 11*a* and 11*b*, an embodiment is shown that fits to a mast angle section 900 instead of a pole.

In the same way as the previous embodiments, universal plates 110, 112, 114 are vertically sandwiched between upper and lower L-shaped plates 902, 904 which in turn are clamped to the angle section 900 with a corresponding L-shaped plate assembly 906.

DESCRIPTION OF THE ELEVENTH EMBODIMENT

Figure 12A:
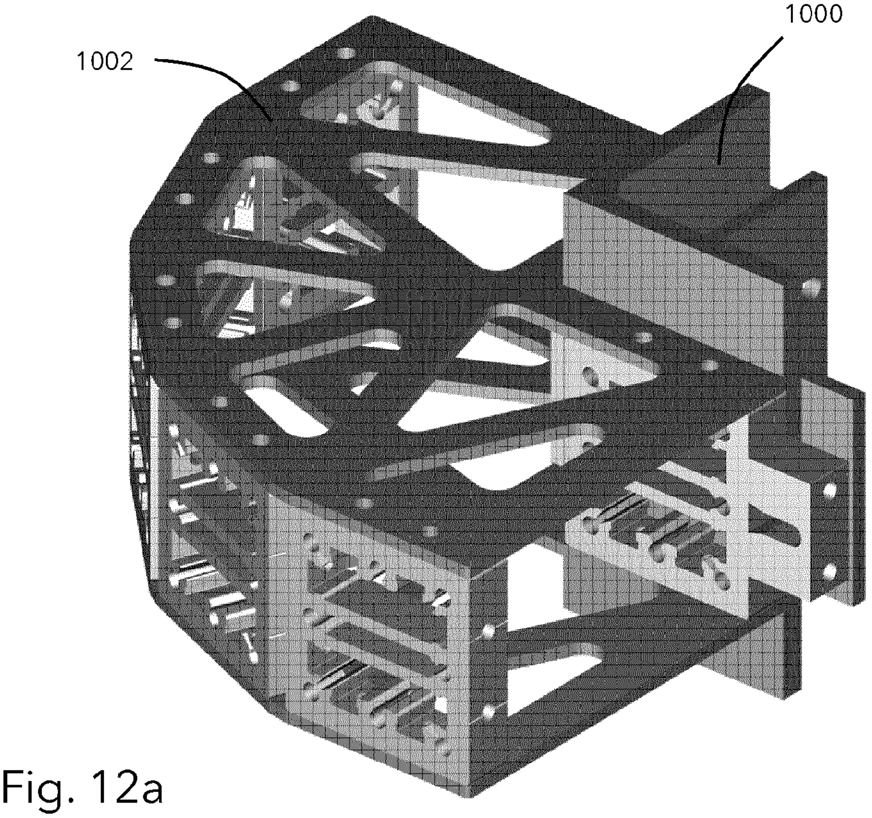
FIGS. 12*a* and 12*b* are perspective views of an eleventh antenna mounting system in accordance with the present invention.
Figure 12B:
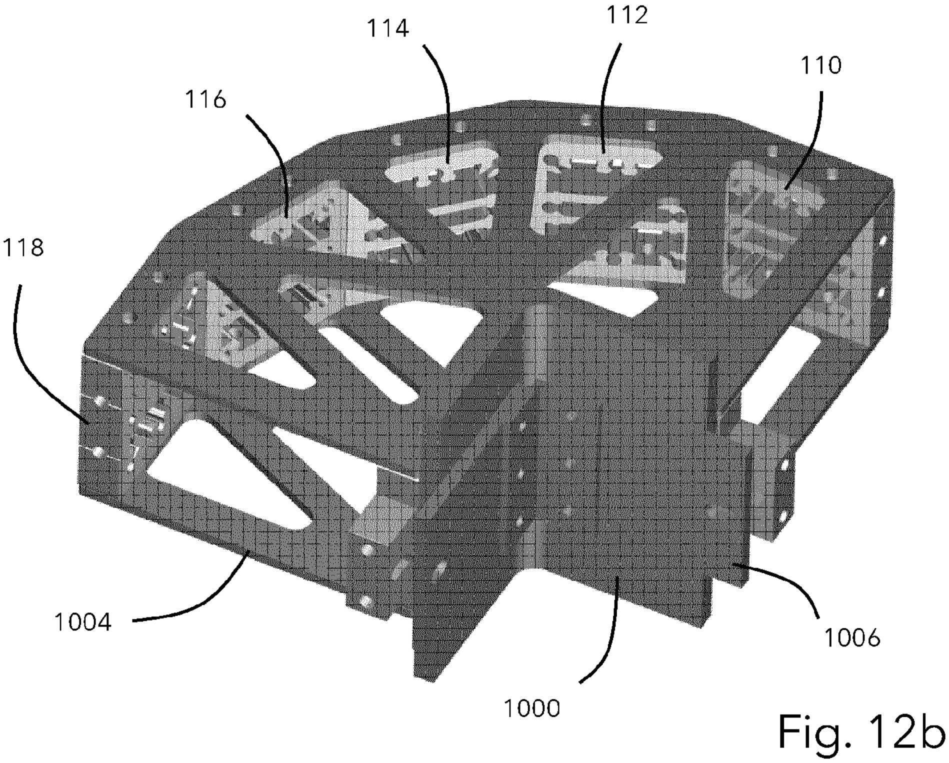

Referring to FIGS. 12*a* and 12*b*, a further embodiment is shown that fits to a mast angle section 1000 instead of a pole.

In the same way as the previous embodiments, universal plates 110, 112, 114,116, 118 are vertically sandwiched between upper and lower shaped plates 1002, 1004 which in turn are clamped to the angle section 1000 with a corresponding L-shaped plate assembly 1006.

DESCRIPTION OF THE TWELFTH EMBODIMENT

Figure 13A:
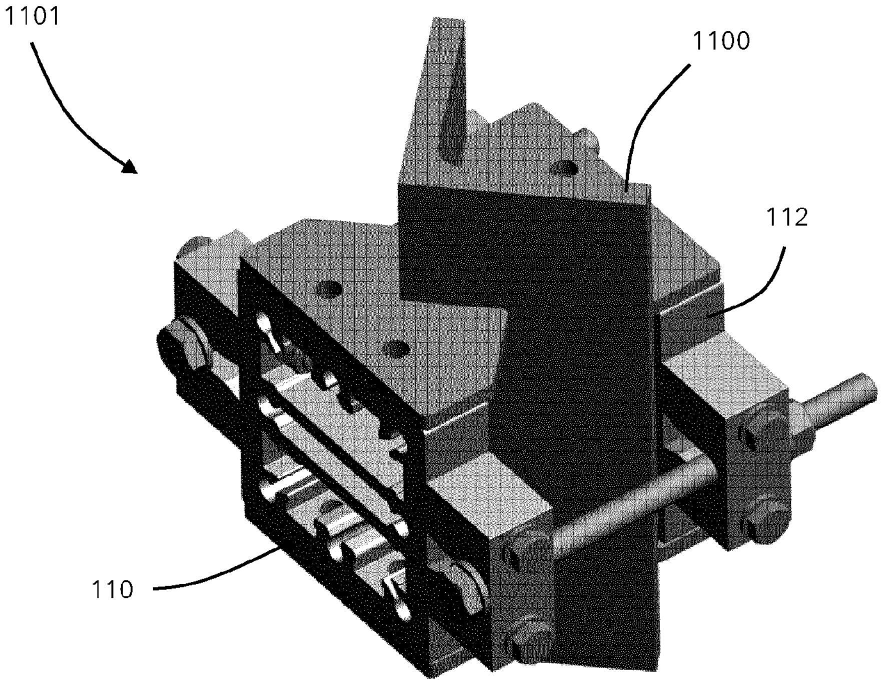
FIGS. 13*a* to 14*b* are perspective views of a twelfth antenna mounting system in accordance with the present invention.
Figure 13B:
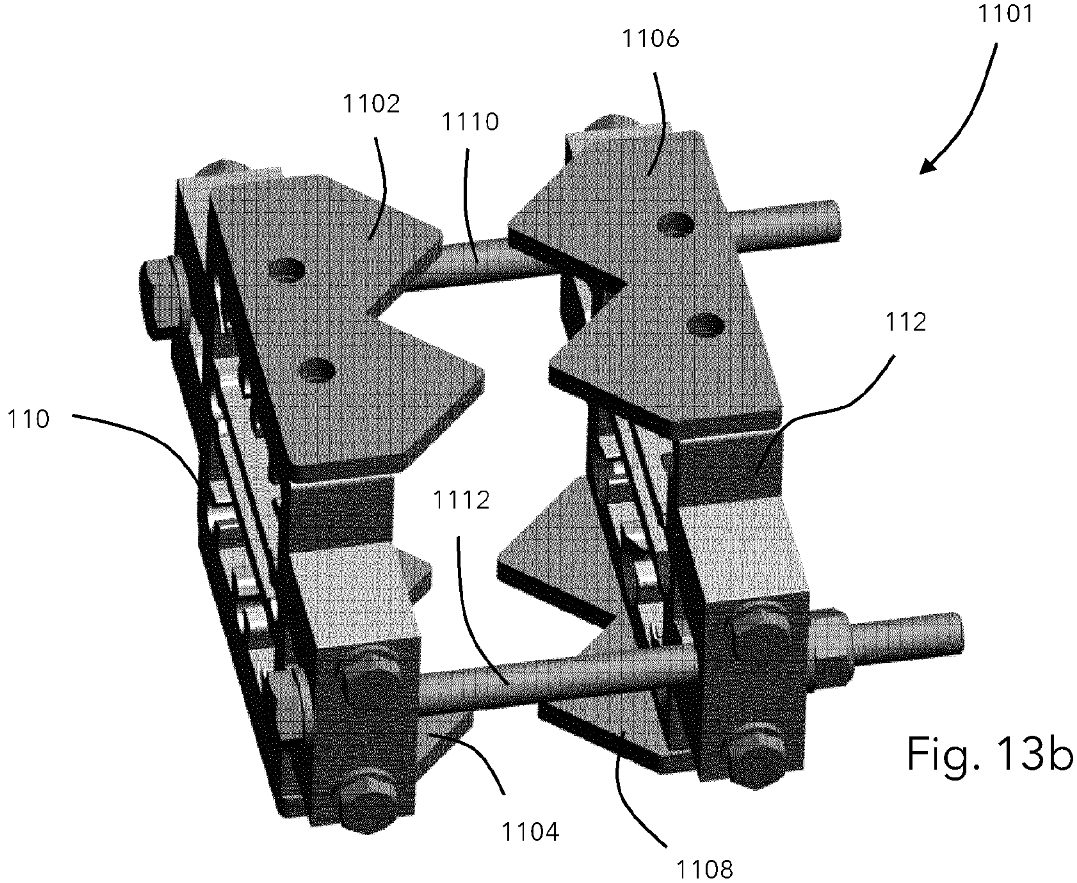

Referring to FIGS. 13*a* and 13*b*, a further embodiment of a mounting assembly 1101 is shown that fits to a mast angle section 1100.

A first side subassembly comprises a universal plate 110 and first upper and lower shaped plates 1102, 1104. The first universal plate 110 is sandwiched between the first upper and lower shaped plates 1102, 1104. The plates 1102, 1104 have an "M" shaped profile configured to engage the convex side of the angle section 1100.

A second side subassembly comprises a universal plate 112 and first upper and lower shaped plates 1106, 1108. The second universal plate 112 is sandwiched between the second upper and lower shaped plate 1106, 1108. The plates 1106, 1108 are for the same shape as the plates 1102, 1104 and engage the concave side of the angle section 1100.

The subassemblies are connected, and clamp the section 1100 via tension bolts 1110, 1112.

It will be noted that as with the above embodiments, the universal plates 110, 112 are parallel to the main axis of the section 1100, and the clamping (shaped) plates 1102, 1104, 1106, 1108 are normal to the axis.

This arrangement allows steering units (and therefore antennas) to be placed on opposing (concave/convex) sides of the section member 1100.

Figure 14A:
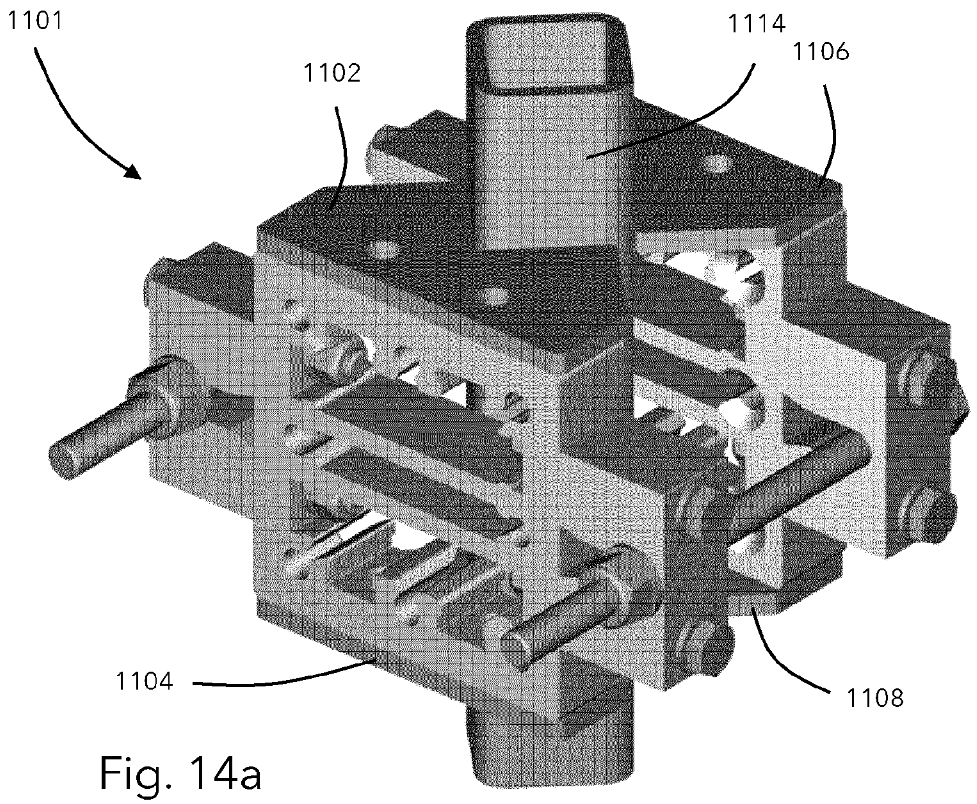
Figure 14B:
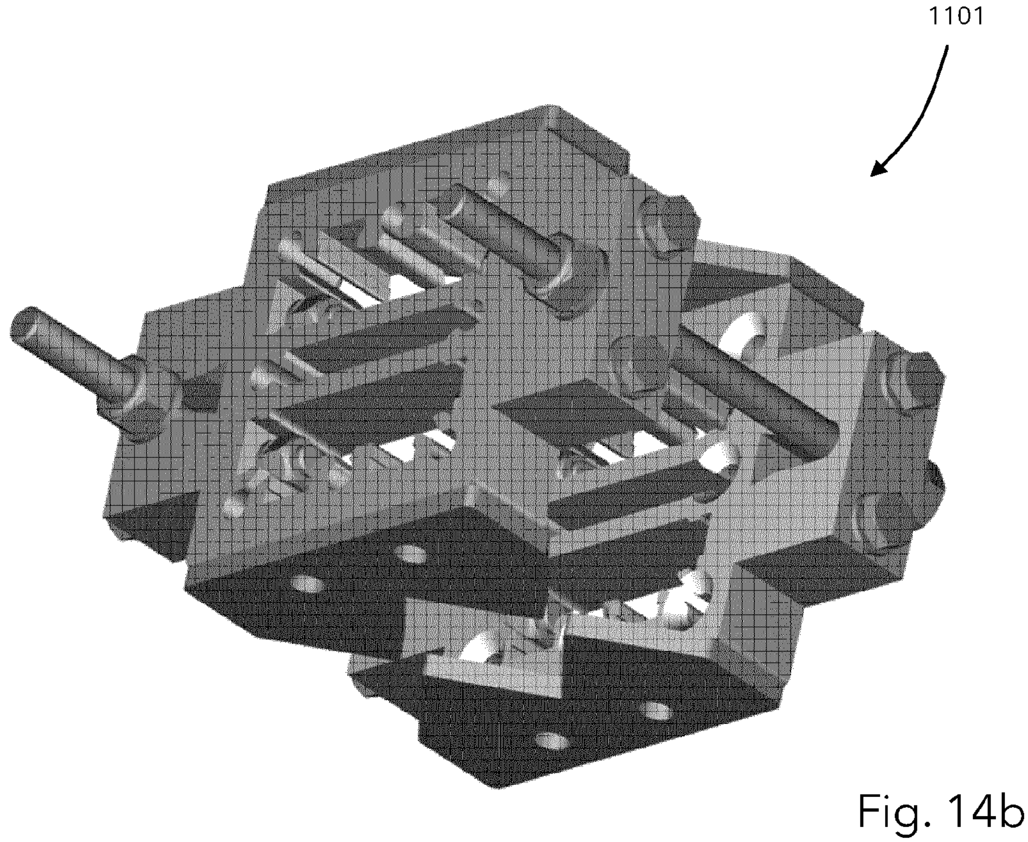

Referring to FIGS. 14*a* and 14*b*, the antenna mounting assembly 1101 is shown clamped to an alternative, square section member 1114. The member section 1114 fits into the M-shaped plates. Therefore the assembly 1101 has the advantage that it may be clamped to two different sections using the same components.

DESCRIPTION OF THE THIRTEENTH EMBODIMENT

Figure 15A:
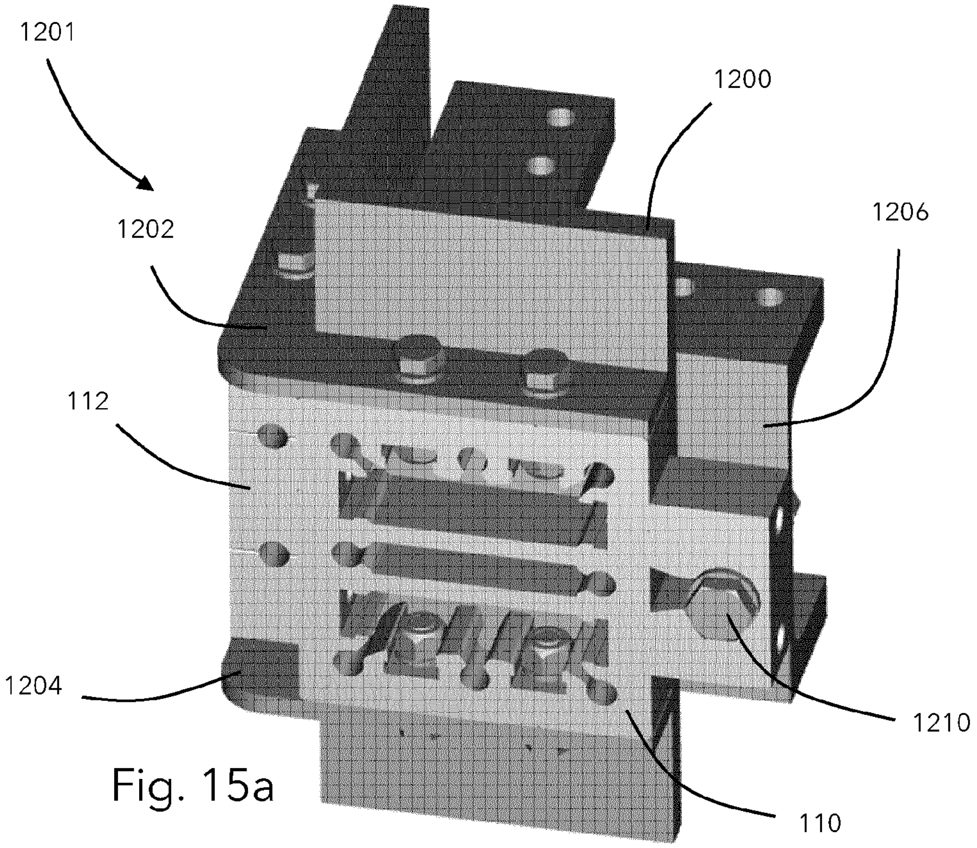
FIGS. 15*a* to 16*b* are perspective views of a thirteenth antenna mounting system in accordance with the present invention; and, FIGS. 17*a* and 17*b* are perspective views of a fourteenth antenna mounting system in accordance with the present invention.
Figure 15B:
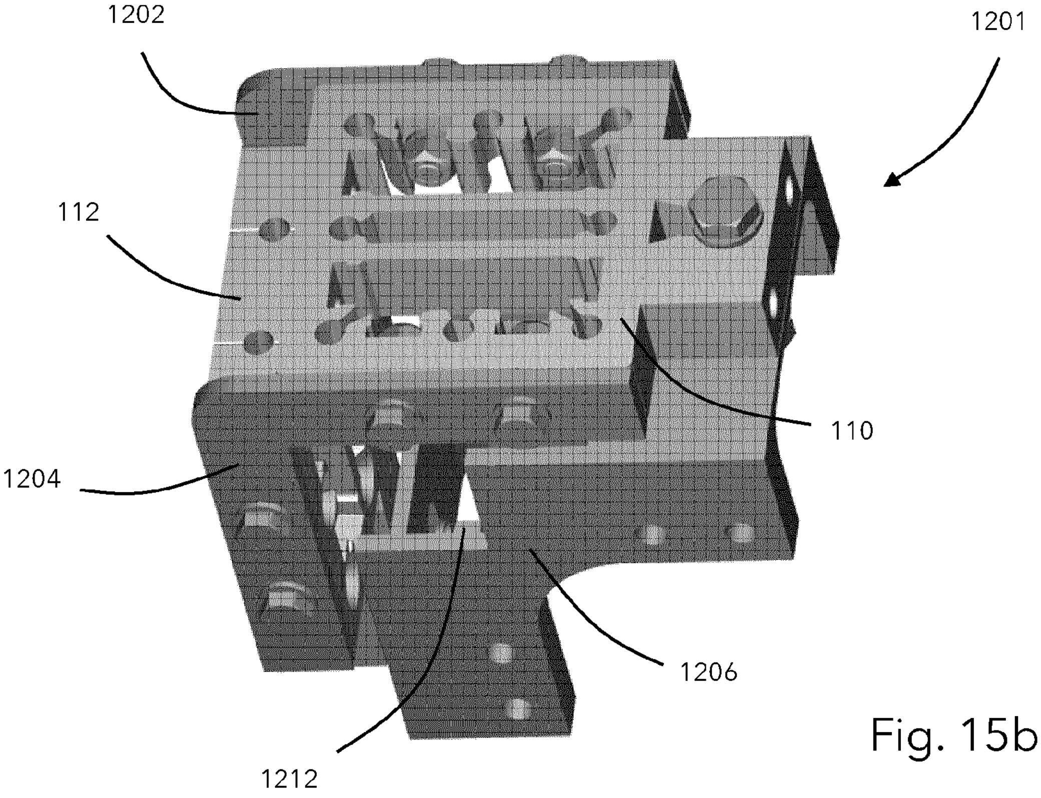

Referring to FIGS. 15*a* and 15*b*, a further embodiment of an antenna mounting assembly 1201 is shown that fits to a mast angle section 1200.

A first side subassembly comprises a universal plate 110, a second universal plate 112 and first upper and lower shaped plates 1202, 1204. The universal plates 110, 112 are at 90 degrees to each other and are is sandwiched between the first upper and lower shaped plates 1202, 1204. The plates 1202, 1204 have an "L" shaped profile configured to engage the convex side of the angle section 1200.

A first side subassembly comprises a bracket 1206 which is generally L-shaped extending beyond the limbs of the L-shaped section 1200. The convex corner of the bracket 1206 has a cutout 1207 providing a generally "M"-shaped edge, The subassemblies are connected, and clamp the section 1200 via tension bolts 1210, 1212.

It will be noted that as with the above embodiments, the universal plates 110, 112 are parallel to the main axis of the section 1100, and the clamping (shaped) plates 1102, 1104, 1106, 1108 are normal to the axis.

Figure 16A:
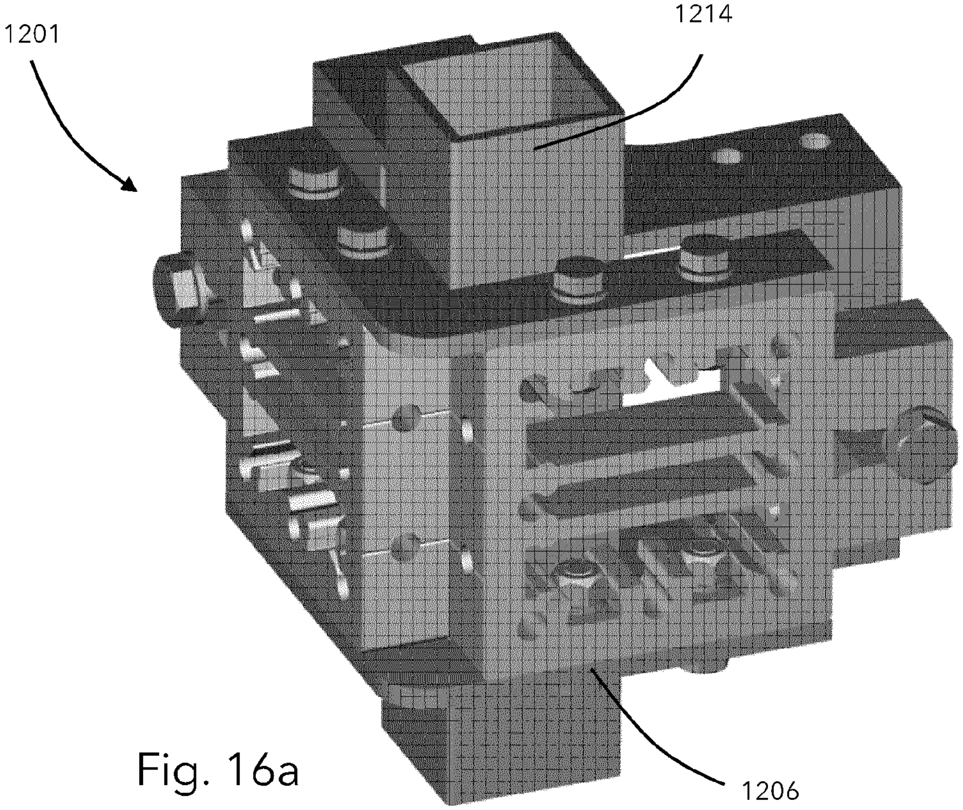
Figure 16B:
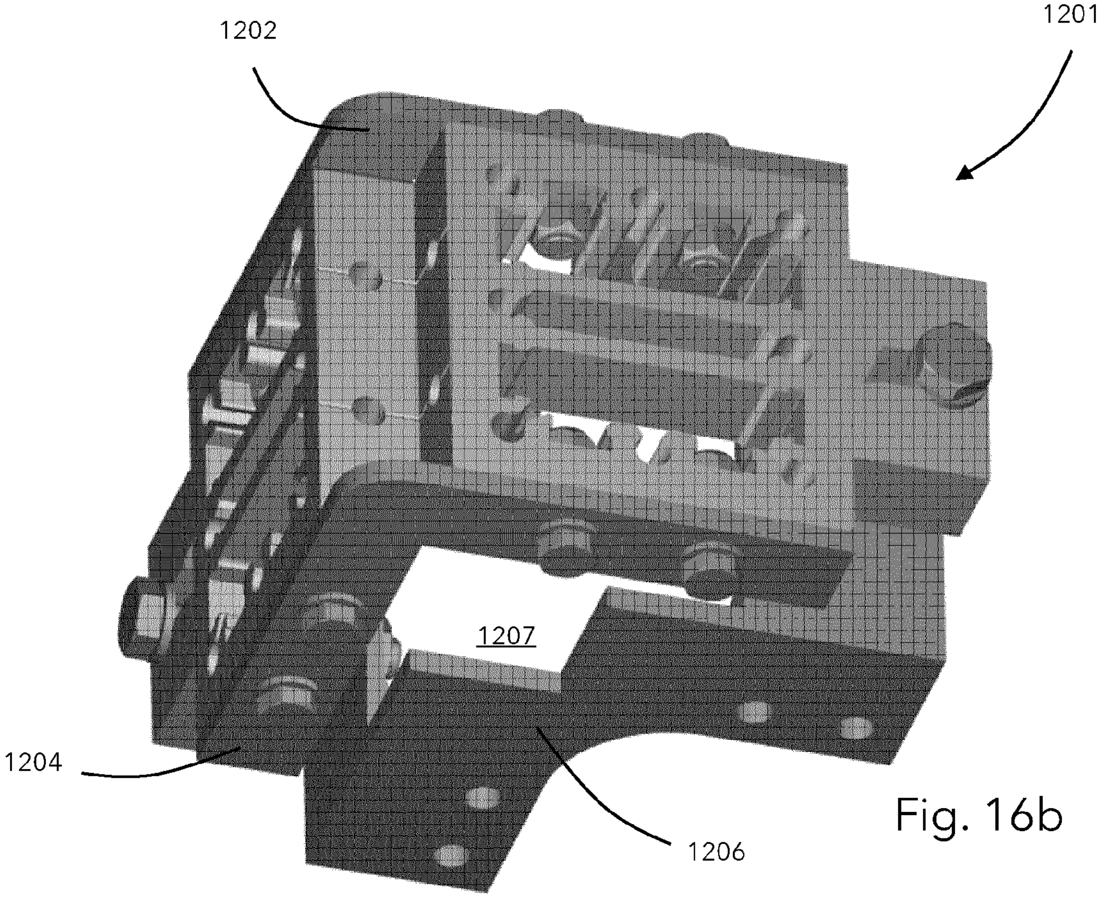

Referring to FIGS. 16*a* and 16*b*, the antenna mounting assembly 1101 is shown clamped to an alternative, square section member 1214. The member section 1214 fits into the L-shaped plates 1202, 1204, and also into the cutout 1207 in the bracket 1206. Therefore the assembly 1201 has the advantage that it may be clamped to two different sections using the same components.

DESCRIPTION OF THE FOURTEENTH EMBODIMENT

Figure 17A:
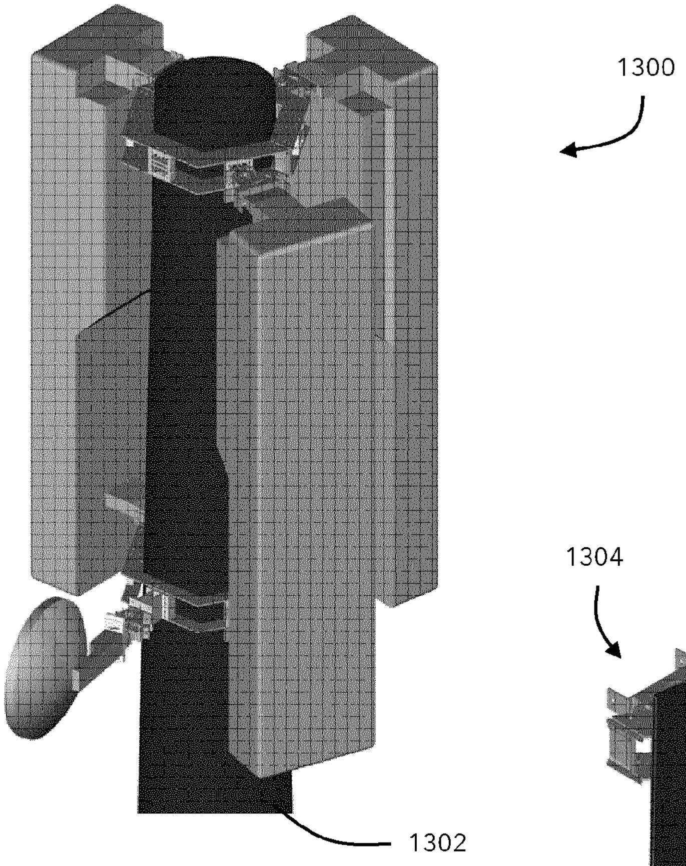
Figure 17B:
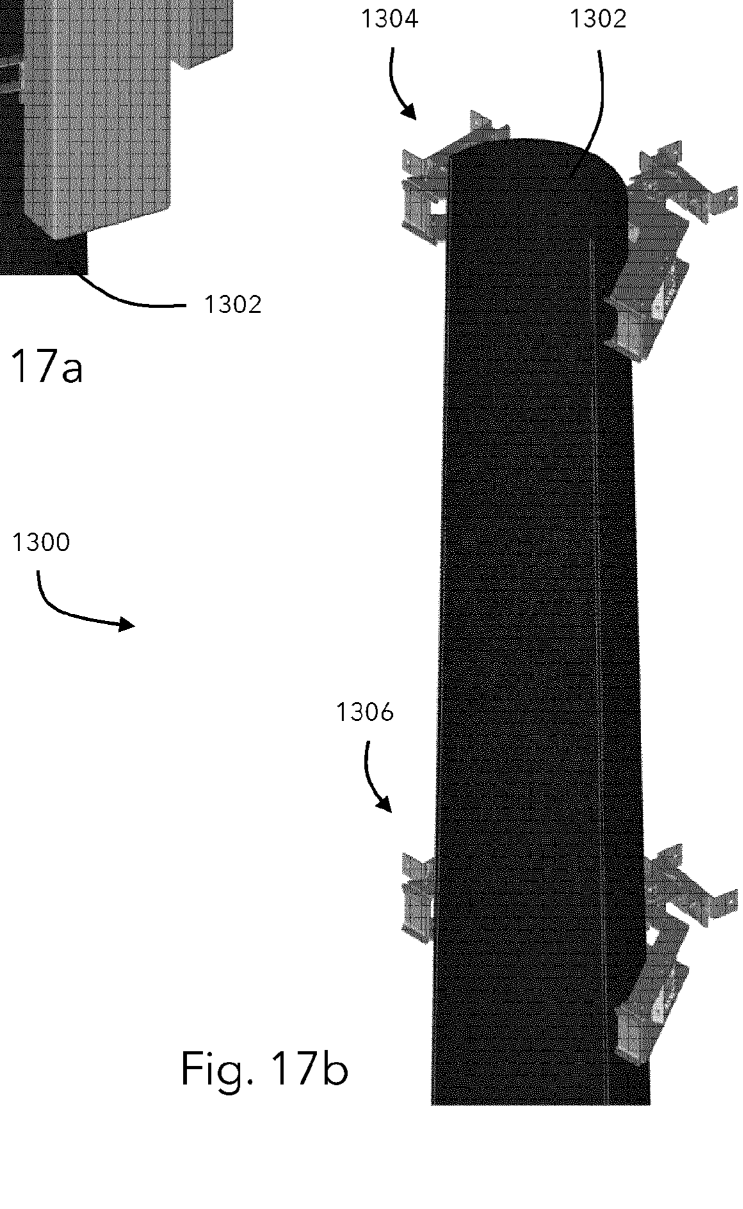

Referring to FIGS. 17*a* and 17*b*, an antenna mounting arrangement 1300 is shown for mounting on a tapered mast section 1302. The tapered mast section 1302 has a circular profile and reduces in diameter along its axis such that a first assembly 1304 is positioned in a region of larger diameter than a second assembly 1306.

The assemblies 1304, 1306 are similar to those shown in FIGS. 8 and 9, comprising universal plates 110, 112 etc that are positioned between clamping plates that surround the section.

VARIATIONS

Although the present invention has been described for attachment to a legacy pole system, it may be directly attached to a mast section such as a monopole, angle section, box section etc.

The invention claimed is:

1. An antenna support system comprising:

an antenna mounting assembly comprising:

a first side subassembly comprising;

a first clamping plate comprising a first clamping plate clamping portion for engagement with a support member in use and a first clamping plate arm extending therefrom;

a second clamping plate comprising a second plate clamping portion for engagement with the support member in use and a second clamping plate arm extending therefrom;

at least one mounting member disposed between and attached to the first and second clamping plate arms such that the at least one mounting member is perpendicular to the first and second clamping plates; and, an azimuth steering unit supported by the or each mounting member;

a second side subassembly; and, first and second mechanical fasteners configured to join the first side subassembly and the second side subassembly either side of the support member to thereby clamp each antenna mounting assembly to the support member in use.

2. An antenna support system according to claim 1, wherein the first and second clamping plates each define an edge profile that is shaped to engage the support member.

3. An antenna support system according to claim 2, wherein the first and second clamping plates each define a concave edge profile for receiving the support member.

4. An antenna support system according to claim 1, wherein each mounting assembly comprises a plurality of mounting members disposed between and attached to the first and second clamping plates, each mounting member having an azimuth steering unit attached thereto.

5. An antenna support system according to claim 4, wherein:

the first side subassembly comprises a first mounting member supporting a first azimuth steering unit; and, the second side subassembly comprises a second mounting member supporting a second azimuth steering unit.

6. An antenna support system according to claim 4, wherein:

the first side subassembly comprises two mounting members each supporting an azimuth steering unit.

7. An antenna support system according to claim 1, wherein the first and second clamping plates each have a different formation to accommodate different shapes and/or sizes of support member.

8. An antenna support system according to claim 7, wherein the first and second clamping plate formations each have a different formation to accommodate a tapered support member.

9. An antenna support system according to claim 1, wherein:

the second side subassembly comprises a further first clamping plate and a further second clamping plate;

the further first clamping plate is co-planar with the first clamping plate;

the further second clamping plate is co-planar with the second clamping plate; and, the first clamping plate and further first clamping plate are attached by the first and second mechanical fasteners; and the second clamping plate and further second clamping plate are attached by further first and further second mechanical fasteners.

10. An antenna support system according to claim 9, wherein:

the second side subassembly comprises:

a second mounting member disposed between and attached to the further first and further second clamping plates such that the mounting member is perpendicular to the further first and further second clamping plates; and, a further azimuth steering unit supported by the further mounting member.

11. An antenna support system according to claim 9, wherein:

the first clamping plate and further first clamping plate are mirror images of each other; and, the second clamping plate and further second clamping plate are mirror images of each other.

12. An antenna support system according to claim 1, wherein the first and second clamping plates are identical.

13. An antenna support system according to claim 1, wherein:

the first side subassembly and the second side subassembly are configured to clamp the support member therebetween; and, the first side subassembly and the second side subassembly are connected at two spaced-apart positions on either side of a main axis of the support member.

14. An antenna support system according to claim 13, wherein the first side subassembly and the second side subassembly are connected at two spaced-apart positions on a line extending through the main axis.

15. An antenna support system according to claim 1, wherein the support member is circular in cross-section.

16. An antenna support system according to claim 1, comprising:

a second antenna mounting assembly offset along the main axis of the support member.

17. An antenna support system according to claim 16, comprising:

an antenna attached to the steering units of the first and second antenna mounting assemblies.

18. An antenna support comprising:

a mast comprising a mast section, the mast section having an axis;

an antenna support system comprising:

at least two antenna mounting assemblies, each antenna mounting assembly comprising:

a first side subassembly comprising;

a first clamping plate comprising a first clamping plate clamping portion for engagement with the mast section and a first clamping plate arm extending therefrom;

a second clamping plate comprising a second plate clamping portion for engagement with the mast section and a second clamping plate arm extending therefrom;

at least one mounting member disposed between and attached to the first and second clamping plate arms such that the at least one mounting member is perpendicular to the first and second clamping plates; and, an azimuth steering unit supported by the or each mounting member;

a second side subassembly; and, first and second mechanical fasteners configured to join the first side subassembly and the second side subassembly either side of the mast section to thereby clamp each antenna mounting assembly to the mast section in use to support two spaced-apart positions on a cellular antenna;

wherein the clamping plates are normal to the axis, and the mounting members are parallel to the axis.

19. An antenna support comprising:

an offset pole subassembly comprising:

a first pole support;

a second pole support;

a pole;

wherein the first and second pole supports are configured to support the pole at a position offset from a mast member in use;

an antenna support system comprising:

at least two antenna mounting assemblies, each antenna mounting assembly comprising:

a first side subassembly comprising;

a first clamping plate comprising a first clamping plate clamping portion engaged with the pole, and a first clamping plate arm extending from the first clamping plate clamping portion;

a second clamping plate comprising a second clamping plate clamping portion engaged with the pole, and a second clamping plate arm extending from the first clamping plate clamping portion;

at least one mounting member disposed between and attached to the first and second clamping plate arms such that the at least one mounting member is perpendicular to the first and second clamping plates; and, an azimuth steering unit supported by the or each mounting member;

a second side subassembly; and, first and second mechanical fasteners configured to join the first side subassembly and the second side subassembly either side of the pole to thereby clamp each antenna mounting assembly to the pole in use to support two spaced-apart positions on a cellular antenna.

* * * * *